(12) United States Patent
Ott et al.

(10) Patent No.: US 7,555,563 B2
(45) Date of Patent: *Jun. 30, 2009

(54) HIGH-PERFORMANCE ADDRESSING AND ROUTING OF DATA PACKETS WITH SEMANTICALLY DESCRIPTIVE LABELS IN A COMPUTER NETWORK

(75) Inventors: Maximilian A. Ott, Pennington, NJ (US); Daniel J. Reininger, Princeton, NJ (US); Dhananjay Makwana, Piscataway, NJ (US); Manpreet Singh, Woodbridge, NJ (US)

(73) Assignee: Semandek Networks Inc., Princeton, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 11/710,870

(22) Filed: Feb. 26, 2007

(65) Prior Publication Data

US 2007/0239892 A1 Oct. 11, 2007

Related U.S. Application Data

(63) Continuation of application No. 09/922,127, filed on Aug. 3, 2001, now Pat. No. 7,216,179.

(60) Provisional application No. 60/225,586, filed on Aug. 16, 2000.

(51) Int. Cl.
*G06F 15/173* (2006.01)
(52) U.S. Cl. ....................... 709/240; 709/238
(58) Field of Classification Search ................. 709/240, 709/238
See application file for complete search history.

(56) References Cited

U.S. PATENT DOCUMENTS

| | | | |
|---|---|---|---|
| 5,974,417 | A | 10/1999 | Bracho et al. |
| 6,006,272 | A | 12/1999 | Aravamudan et al. |
| 6,029,195 | A | 2/2000 | Herz |
| 6,055,364 | A | 4/2000 | Speakman et al. |
| 6,154,745 | A | 11/2000 | Kari et al. |
| 6,324,584 | B1 | 11/2001 | Mandalia |
| 6,374,290 | B1 | 4/2002 | Scharber et al. |

(Continued)

FOREIGN PATENT DOCUMENTS

CN 1299488 A 6/2001

(Continued)

OTHER PUBLICATIONS

Aguilera, M.; Strom, R.; Sturman, D.; Astley, M.; Chandra, T. 1999 "Matching Events in a Content-based Subscription System". Principles of Distributed Computing.

(Continued)

*Primary Examiner*—Larry D Donaghue
*Assistant Examiner*—Asghar Bilgrami
(74) *Attorney, Agent, or Firm*—Wilmer Cutler Pickering Hale and Dorr LLP

(57) ABSTRACT

A method, system and apparatus for routing data through a network based on the content or semantics of the data. Semantic routing engines route the data through the network based upon information maintained in routing tables. The routing tables used to route the content through the network are derived by aggregating information about either content consumers or content producers into ontological.

46 Claims, 23 Drawing Sheets

U.S. PATENT DOCUMENTS

| | | | |
|---|---|---|---|
| 6,421,675 | B1 | 7/2002 | Ryan et al. |
| 6,498,795 | B1* | 12/2002 | Zhang et al. ............... 370/400 |
| 6,606,744 | B1 | 8/2003 | Mikurak |
| 6,632,251 | B1 | 10/2003 | Rutten et al. |
| 6,697,824 | B1 | 2/2004 | Bowman-Amuah |
| 6,701,362 | B1 | 3/2004 | Subramonian et al. |
| 6,922,567 | B1 | 7/2005 | Rydbeck |
| 6,965,920 | B2 | 11/2005 | Pedersen et al. |
| 7,293,109 | B2 | 11/2007 | Ott et al. |
| 2002/0004844 | A1 | 1/2002 | Harari et al. |
| 2002/0022453 | A1* | 2/2002 | Balog et al. .............. 455/41 |
| 2002/0049727 | A1* | 4/2002 | Rothkopf .................. 707/1 |
| 2002/0062300 | A1 | 5/2002 | Asadov et al. |
| 2002/0062361 | A1 | 5/2002 | Kivipuro et al. |
| 2002/0091736 | A1 | 7/2002 | Wall |
| 2002/0150093 | A1 | 10/2002 | Ott et al. |
| 2002/0174050 | A1 | 11/2002 | Eynard et al. |
| 2003/0105826 | A1 | 6/2003 | Mayraz |
| 2004/0022453 | A1 | 2/2004 | Kusama et al. |
| 2004/0042596 | A1 | 3/2004 | Kim et al. |
| 2004/0098449 | A1 | 5/2004 | Bar-Lavi et al. |
| 2004/0122891 | A1 | 6/2004 | Meyers et al. |
| 2004/0153545 | A1 | 8/2004 | Pandya et al. |
| 2004/0243715 | A1 | 12/2004 | Yokoyama |
| 2005/0021666 | A1 | 1/2005 | Dinnage et al. |
| 2005/0071674 | A1 | 3/2005 | Chou et al. |
| 2007/0129073 | A1 | 6/2007 | Koch et al. |

FOREIGN PATENT DOCUMENTS

| | | |
|---|---|---|
| GB | 2341700 | 3/2000 |

OTHER PUBLICATIONS

Aguilera, M.; Strom, R.; Sturman, D.; Astley, M.; Chandra, T. 1999. "Matching Events in a Content-based Subscription System". Proceedings of Principles of Distributed Computing. Atlanta, GA. May 1999.

Banavar, G.; Chandra, T.; Mukherjee, B.; Naqarajarao, J.; Strom, R.; Stuman, D. 1999. "An Efficient Multicase Protocol for Content-Based Publish-Subscribe Systems". International Conference on Distributed Computing Systems.

Banavar, G.; Kaplan, M.; Shaw, K.; Strom, R.; Sturman, D.; Tao, T. 1999. "Information Flow Based Event Distribution Middleware". Middleware Workshop at International Conference on Distributed Computing Systems.

Carzaniga, A.; Wolf, A. 2001. "Design and Evaluation of a Wide-Area Even Notification Service." ACM Transactions on Computer Systems. 19(3): 332-383. Aug. 2001.

Carzaniga, A; Rosenblum, D.; Wolf, A. 2000. "Content-Based Addressing and Routing: A General Model and its Application". Technical Report CU-CS-902-00. Department of Computer Science University of Colorado at Boulder. Jan. 2000.

Dao, S.; Perry, B. 1996. "Information Dissemination in Hybrid Satellite/Terrestrial." Data Engineering Bulletin. 19(3): 12-18. Sep. 1996.

Dao, S.; Perry B.; Shek, E.; Vellaikal, A.; Muntz, R.; Zhang, L.; Potkonjak, M.; Wolfson, O. 1999. "Semantic Multicast: Intelligently Sharing Collaborative Sessions". ACM Computing Surveys.

Devanbu, P.; Stubblebine, S.; Uschold, M. 2000. "The Next Revolution: Free, Full, Open Person-2-Person (PSP) E-commerce." Workshop on Internet-scale Software Technology, University of California, Irvine, California. Jul. 3, 2000.

Duda, A.; Sheldon, M. 1994. "Content Routing in a Network of WAIS Servers." 14th IEEE International Conference on Distributed Computing Systems. Poland. Jun. 1994.

Ives, Z.; Levy, A.; Weld, D. 2000. "Efficient Evaluation of Regular Path Expression on Streaming XML Data". Technical Report UW-CSE-2000-05-02. University of Washington Department of Computer Science and Engineering.

Opyrchal, L.; Astley, M.; Auerbach, J.; Banavar, G.; Strom, R.; Sturman, D. 2000. "Exploiting IP Multicast in Content-Based Publish-Subscribe Systems". Proceedings of Middleware.

Ott et al., "The Journey Active Network Model," IEEE JSAC, vol. 19, No. 3, pp. 527-537, Mar. 2001.

Segall, B.; Arnold, D. 1997. "Elvin has left the building: A publish/subscribe notification service with quenching." Austrian Unix Users Group Annual Conference pp. 243-255.

Sheldon, M. 1995. "Content Routing: A Scalable Architecture for Network-Based Information Discovery." Ph.D. Thesis, MIT.

Sheldon, M.; Duda, A.; Weiss, R.; O'Toole, J.; Gilford, D. 1994. "Content Routing for Distributed Information Servers." Proceedings of Fourth International Conference on Extending Database Technology. Cambridge, England. Mar. 1994.

Sturtevant, N.; Tang, N.; Zhang, L. 1999. "The Information Discovery Graph: Towards a Scalable Multimedia Resource Directory". Proceedings of IEEE Workshop on Internet Applications (WIAPP). San Jose, California. Jul. 1999.

* cited by examiner

HIGH-PERFORMANCE ADDRESSING AND ROUTING OF DATA PACKETS WITH SEMANTICALLY DESCRIPTIVE LABELS IN A COMPUTER NETWORK

This application is a continuation of U.S. patent application Ser. No. 09/922,127, filed Aug. 3, 2001, now U.S. Pat. No. 7,216,179, issued May 8, 2007, which claims priority to Provisional Application Ser. No. 60/225,586 filed Aug. 16, 2000 as provided for under 35 U.S.C. §119(e), which application is expressly incorporated herein by reference in its entirety.

FIELD OF THE INVENTION

The present invention relates to a method, system and apparatus for routing content through a network based on the semantics of the content being routed. More particularly, the present invention relates to a method, system and apparatus for routing content through a network based on the aggregation of information into ontological trees that routers in a network use to route content.

BACKGROUND OF THE INVENTION

In the field of communication networks, one of the purposes of a communication network is to deliver information to an endpoint of that network for onward transmission, for further processing by manual or automated means, or for display or storage. The information is transmitted as the content (or payload) of messages within the network. The messages are routed and delivered based on a numerical address that accompanies the information. This information is desired by content consumers, specifically the humans or automated processing and storage systems associated with the network endpoints. However, this content is typically invisible to the transport mechanism employed within the network and, therefore, is not considered when performing addressing, routing or delivery operations.

Methods currently exist that attempt to allow content consumers to discover data based on the actual content available in a network as opposed to a numeric network address, or other fixed form of resource locator, for example a URL. The most well known method used to locate data on the Internet is performing a search using a search engine. Typically, an Internet search engine operates by indexing web pages and returns search results to the consumer based on its index. The index is typically created by using bots (software tools used for digging through data) to crawl through the Internet and examine content and index the findings. There are several drawbacks to this methodology. First, it takes time for the bots to crawl through the Internet indexing web pages. Typically, the time required for such indexing operations is twenty-eight days. Because of the time delay, the resultant index typically contains a multitude of links to web pages that have significantly changed or disappeared altogether since the beginning of the indexing cycle. Secondly, not all web pages are indexed. Thus, pertinent information may exist without any way for a user to access it other than by knowing the exact resource locator of the server that stores the pertinent information.

Another method in existence today for matching content to content consumers is by using channels, which is also closely related to publish/subscribe methods. Under both these methods, content consumers subscribe to or dial up a particular source or channel that carries a predefined range of content. An example of this is the now defunct PointCast™ network.

There are several disadvantages associated with distributing content based on this method. First, the content consumer still has to know where the desired channel is located. Second, the content consumer receives all the content on that channel whether or not he or she is interested in it. Further, such many-to-many event notification technologies such as publish/subscribe are stateless for scalability and robustness. Thus, they require parties to persistently re-send messages. As a result, network nodes need to re-compute the routing algorithm on each message received regardless of whether or not it is a new message. Also nodes that do not remember the outcome of a routing decision for a given data packet must re-compute the algorithm on each packet received. This forces a trade-off among scalability (number of senders and receivers), semantic expressiveness of subscription and advertisement language, and notification persistency (message frequency). This trade-off has limited the commercial deployment of event notification technologies to a limited scope (local area networks, limited number of senders or receivers, limited flexibility to express interest).

SUMMARY OF THE INVENTION

The present invention provides a method, system, and an apparatus which uses information aggregated into ontological trees to route data based on the content of the data through a network. An ontology is a systematic account of the concepts and relationships that can exist for an object and between objects. Typically, by equating an ontology with a taxonomic hierarchy of classes, the properties of those classes are said to form an ontological tree.

In an exemplary embodiment of the present invention, content consumers submit a user interest profile to the network. The user interest profile along with other information and/or instructional fields becomes the semantic profile. The user interest profile contains information about a content consumer's interest in a particular subject matter. The content consumer's semantic profile is sent to a semantic router that operates on the consumer profile by discovering overlapping interest among a plurality of semantic profiles associated with that semantic router. The identified overlapping areas are used to aggregate the various consumer profiles into ontological trees that are used to route content through a network to content consumers. The network may have one or more semantic routers that communicate and exchange information with each other so as to obtain a topological knowledge of the network. Information exchanged between semantic routers may include topological knowledge of the network and the semantic profiles associated with neighboring routers. Topological knowledge may comprise the physical and logical structure of the arrangement of routers within the network, for example in constituting a routing tree or a distribution ring, and the direct or indirect (multi-hop) routes connecting adjacent (neighboring) routers in the semantic network.

Content producers produce content that is encapsulated in a-semantic packet that contains the produced content as well as several other informational and/or instructional fields. The semantic packet is propagated through the network to a final destination, e.g., a content consumer, based on the content of the packet using the aggregated semantic profiles as routing tables. The semantic routers operate in a 'store and forward' mode and do not retain copies of semantic packets once they have been transmitted.

The method of the present invention scales as (N)log(N), where N is the number of nodes in the system, where a node is an endpoint or a semantic router.

BRIEF DESCRIPTION OF THE DRAWINGS

Like reference numbers in the various drawings indicate like elements.

DETAILED DESCRIPTION

Figure 1:
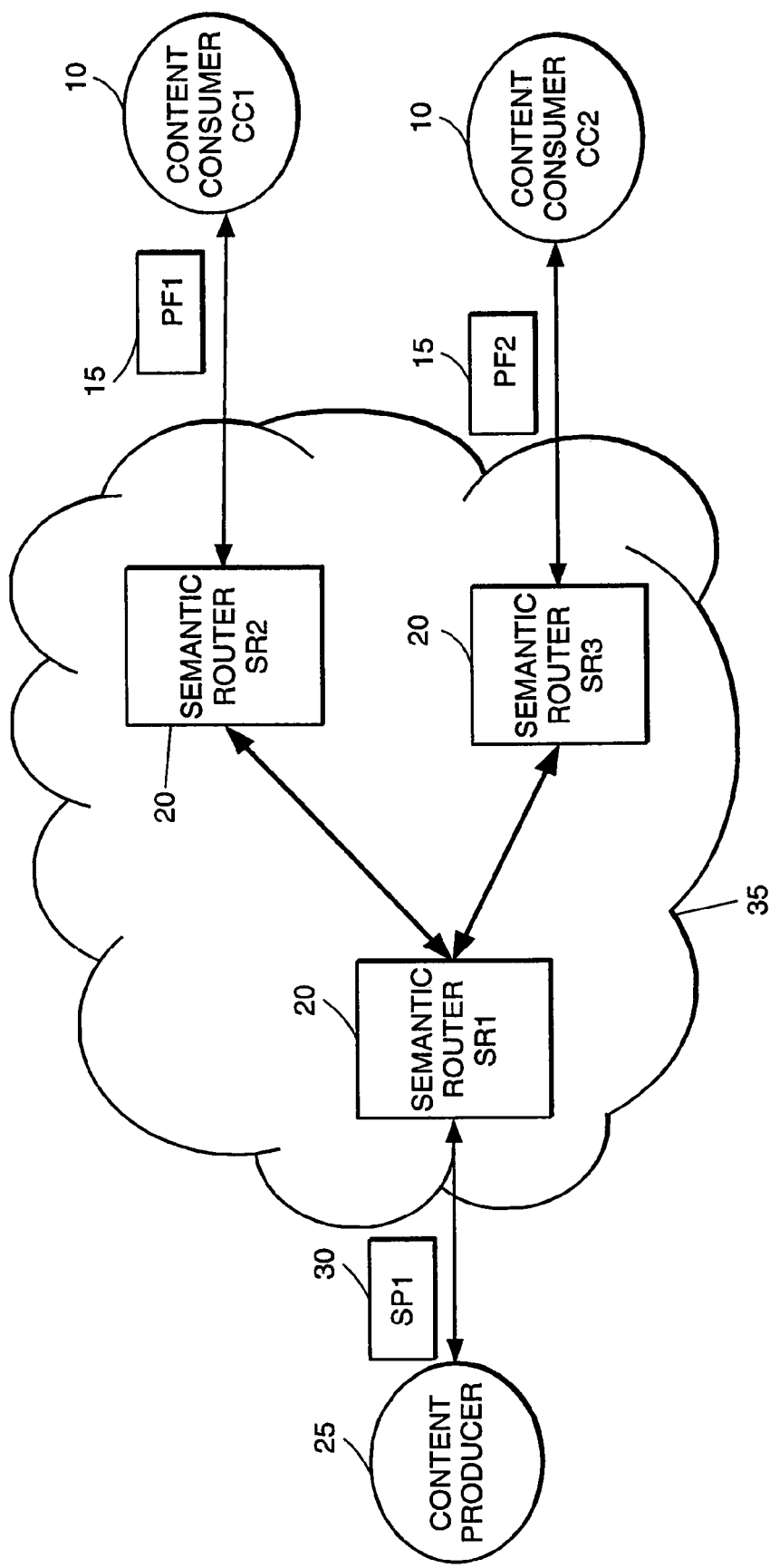
FIG. 1 illustrates an overview of the content routing system of the present invention.

In the following detailed description, numerous specific details are set forth regarding the system and method of the present invention and the environment in which the system and method of the present invention may operate, etc., in order to provide a thorough understanding of the present invention. It will be apparent, however, to one skilled in the art that the present invention may be practiced without such specific details. In other instances, well-known components, structures and techniques have not been shown in detail to avoid unnecessarily obscuring the subject matter of the present invention. Moreover, various examples are provided to explain the operation of the present invention. It should be understood that these examples are exemplary. It is contemplated that there are other methods and systems that are within the scope of the present invention. Also, the same reference numerals are used in the drawings and in the description to refer to the same elements to simplify the description.

System Overview

FIG. 1 is an overview of the content routing system of the present invention. A content consumer 10 expresses an interest in receiving certain types of content by creating a consumer interest profile (PF) 15, which is injected into the semantic network 35. Individual semantic profiles are aggregated with other semantic profiles received by a semantic router." The aggregated profiles are subsequently propagated through the semantic network 35 by semantic routers 20. Alternatively, the semantic routers interact with other semantic routers through conventional IP routers in which the semantic profiles are propagated by tunneling. Tunneling in the context of semantic routing refers to the encapsulation of the semantic packets and/or semantic profiles in a network-layer datagram to route them through parts of an internetwork, such as the Internet, that does not support semantic routing. The encapsulation is added on entry to a tunnel and stripped off on exit from a tunnel. The aggregated semantic profiles are stored on semantic routers 20 and the information contained in the aggregated semantic profiles is used to determine the routing of semantic packets arriving at the semantic router.

Content producers 25 are systems that produce content to be consumed, e.g., viewed, by content consumers. Once the content is produced it is encapsulated into a semantic packet 30 and sent to a semantic router 20 connected to other semantic routers 20 through a network, either directly or through other conventional network routers. The semantic packets 30 are then propagated through the semantic network toward a content consumer. The semantic packets 30 are routed to their consumers based on the aggregated semantic profiles stored on the semantic routers 20 and the match between the content consumer's semantic profile 15 and the content of the content producer's semantic packet 30.

Figure 2:
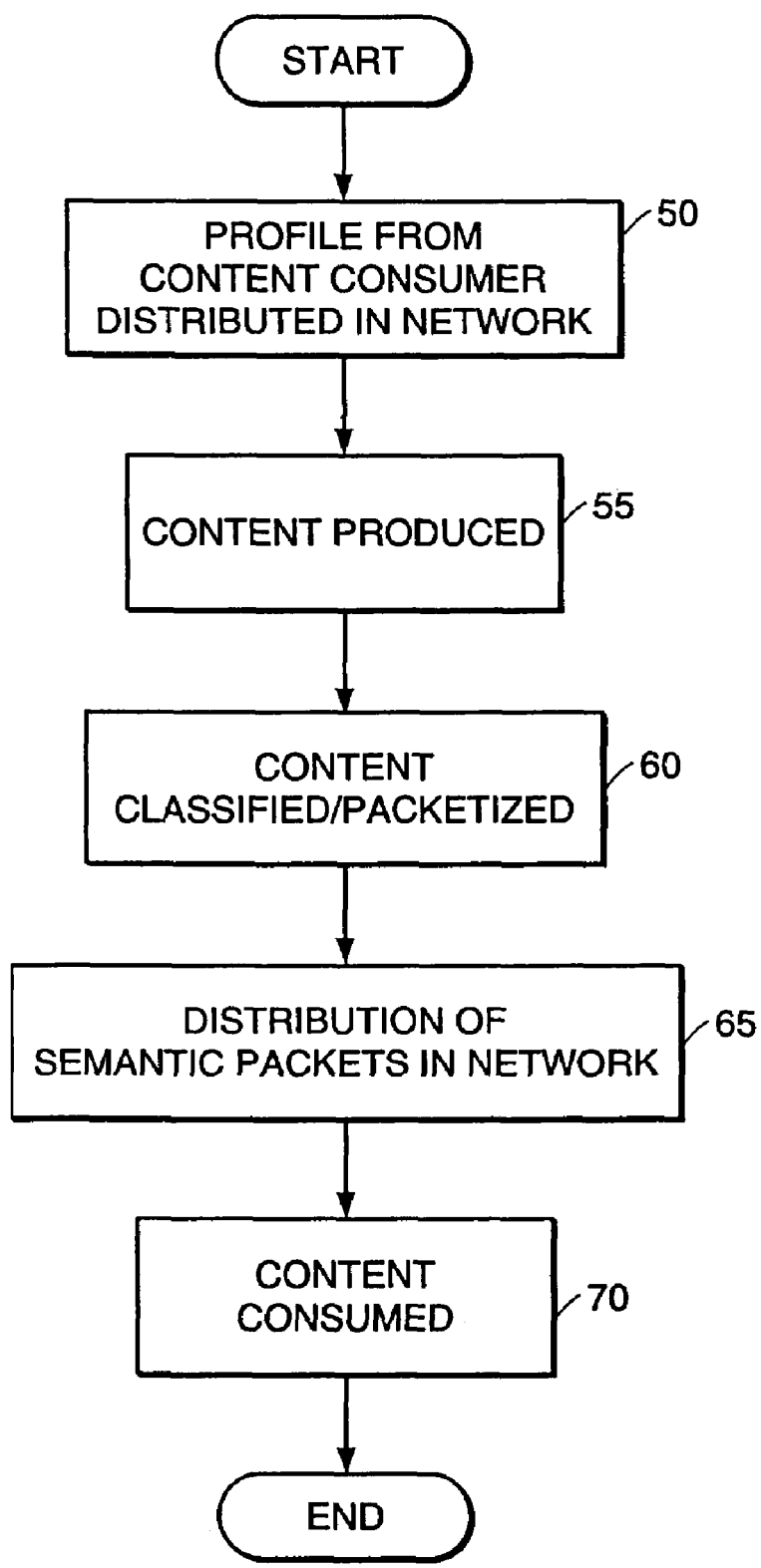
FIG. 2 is a flow diagram of the general operation of the system of the present invention.

FIG. 2 is a flow diagram of the general operation of the system of the present invention. At step 50, the semantic profile from a content consumer peer client is injected into the semantic network. At step 55, a content producer produces the content. Alternatively, the content producer produces the content to be consumed sometime prior to the creation of a particular semantic profile. At step 60, the content is classified or packetized by classifiers in the content producer peer client. The classifier is an apparatus and a method for generating the semantic description of the content for use by the semantic router. This classification process generates one or more semantic descriptors. The classifier also calculates the semantic signature, which is further used by the semantic routers to route the semantic packets efficiently. A semantic signature is a coded representation of some, or all, of the information content of the packet that can be compared against a similar signature for a semantic profile. An example of a possible semantic signature could be realized by a many-to-one function operating over the information (for example a 'hashing' function familiar to the computing community) calculated in such a way that similar interests generate identical values, but dissimilar interests generate (possibly) different values. At step 65, the semantic packet is then distributed in the semantic network by semantic routers. Associated with each link in the semantic network, connecting nodes in the semantic network, is a semantic profile. When a semantic packet matches a semantic profile for a link, the semantic packet propagates across that link towards the matching content consumer or consumers. If the semantic packet does not match, the packet may or may not be forwarded. The method of determining whether or not to send a packet on a given link is termed filtering. The destination address for the routing is implicitly specified by the semantic descriptor in the semantic packet. At step 70, the content is consumed, e.g., viewed, by the content consumer after final filtering at the filter in the content consumer peer client.

Figure 3:
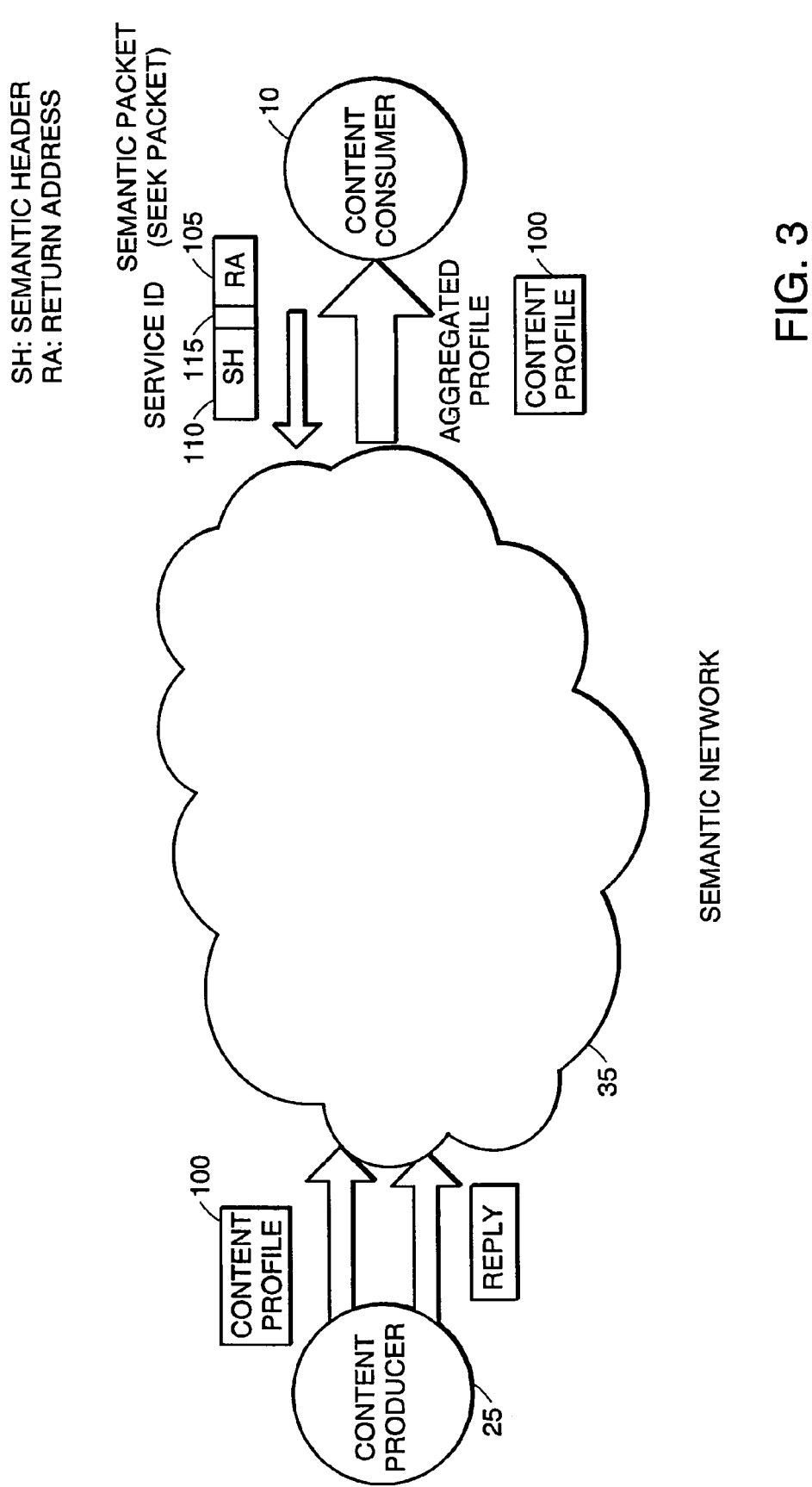
FIG. 3 illustrates the reverse operation of the content routing system of the present invention.

Alternatively, the present invention can work in the reverse. FIG. 3 illustrates the reverse operation of the above described system of the present invention. In the reverse mode of operation, the system is said to have memory attributed to it. In this mode, instead of content consumer 10 announcing the interest profile, content producers 25 announce the content profile 100. This content profile 100 is then aggregated with other such content profiles 100 and distributed throughout the semantic network 35 like the semantic profiles 15. At semantic routers these content profiles 100 are stored in a separate routing data area. The content consumers 10 then send a "seek packet" 105 that is similar to the semantic packet 30. Within the semantic header 110 of a general semantic packet 30 there is contained a service identification or "service ID" 115. This service ID 115 is used to distinguish between a semantic packet 15 and a seek packet 105. The semantic router uses the service ID to decide whether to use the routing data of semantic profiles 15 or the separate routing data area for content profiles 160. The seek packet 105 also has a "return address", which is used by the content producers 25 to push the content towards the content consumers 10. The seek packets 105 are routed in the semantic network 35 using the content profile tables at semantic routers. When a seek packet 105 reaches the content producer 25, the content producer 25 extracts the return address specified in the seek packet 105. Using this return address, a content producer 25 can directly push the content towards the content consumers 10 using conventional network addressing. In an alternative embodiment of this particular aspect of the invention, one or more content consumers inject an interest profile 15 into the semantic network which will match the seek packet. In this embodiment, the seek packet does not contain a return address, but the information is delivered through the semantic network 35. This aspect of the operation gives users a kind of search capability because the seek packet 105 may contain a search query that is then delivered to content producers 25 that have the relevant content. Since content producers 25 advertise their content with content profiles 100, the seek packets 105 need not travel towards unrelated content producers 25. Also, the content profiles 100 can be aggregated in the semantic network towards the content consumers 10. These operations contribute to the scalability of the entire system.

Operating Environment of System

Figure 4:
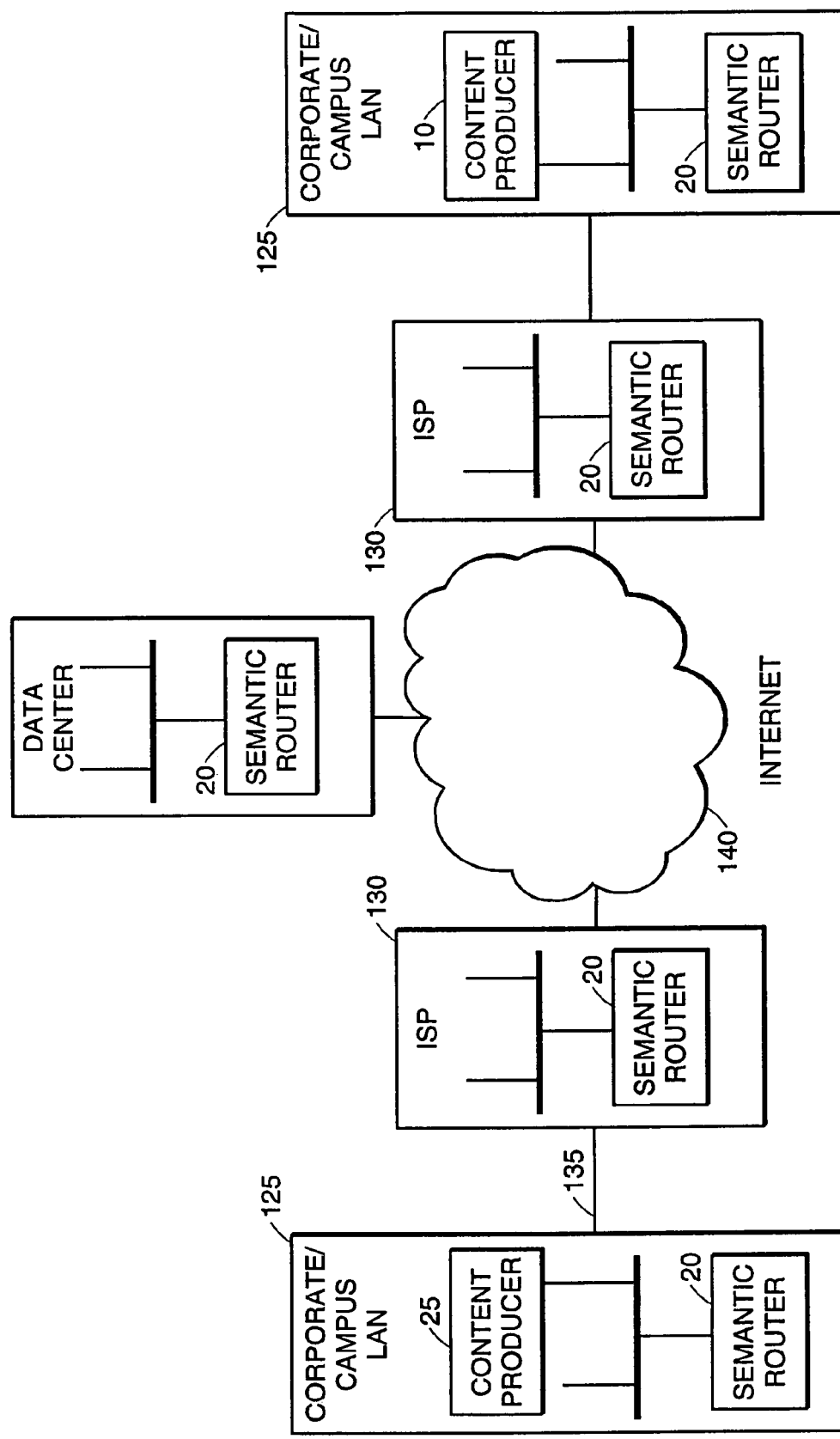
FIG. 4 illustrates an environment in which the present invention operates.

FIG. 4 illustrates an environment in which the present invention may be operated. The content producers 25 and content consumers 10, connected to their corporate or campus local area networks (LANs) 125, form the end users. The LANs are in turn connected to Internet service providers (ISPs) LANs 130 through network links 135. The ISPs 130 are in turn connected to the Internet 140. The semantic routers 20 present in each of the LANs 130 are in turn connected to other semantic routers 20 distributed across the Internet 140. In an alternative environment the content producers and consumers may be connected using cellular telephony or other wireless media. Alternatively, content producers and consumers may be located in Data Centers. Data Centers are warehouses for hosting network servers that are connected directly into the network with high-speed links and provide, for example, e-commerce Web-based services.

Peer Client

Figure 5:
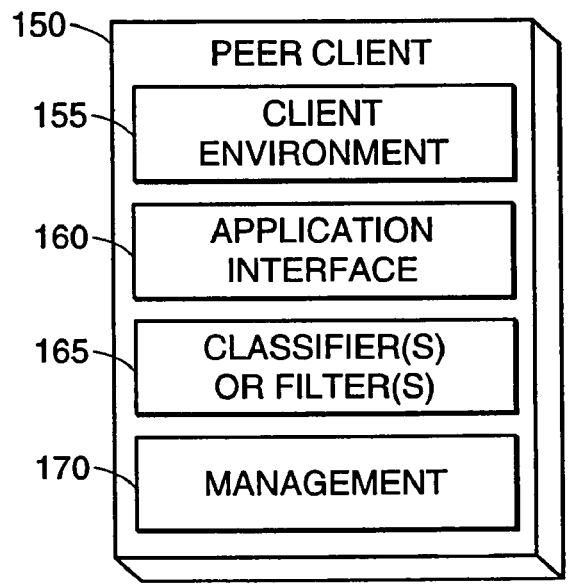
FIG. 5 illustrates the general structure of the peer client of the present invention.

FIG. 5 illustrates the general structure of the peer client of the present invention. The peer client is a logical object within the architecture that may be located within the content producer, the content consumer, a semantic router, or in a separate physical machine. The modules in the peer client 150 for both content producer and content consumer include the client environment 155, the application interface 160, classifier(s) and/or filter(s) 165, and the management module 170. The client environment 155 module includes the client identification, which identifies the client on behalf of which the peer client processes packets. Semantic profiles and semantic packets contain information about the client environment 155. The application interface 160 is the interface between the semantic network and a particular application. The management module 175 functions include finding close access point semantic routers, then establishing and authorizing a connection into the semantic network. One or more classifiers 165 are used to classify or encode the information in the context of different information domains. An information domain determines the form in which the semantic information is encoded. An example of an information domain is a schema for representation in an XML encoding. The classifiers 165 operate independently of each other so new classifiers 165 can be added without affecting others.

Semantic Router

Figure 6:
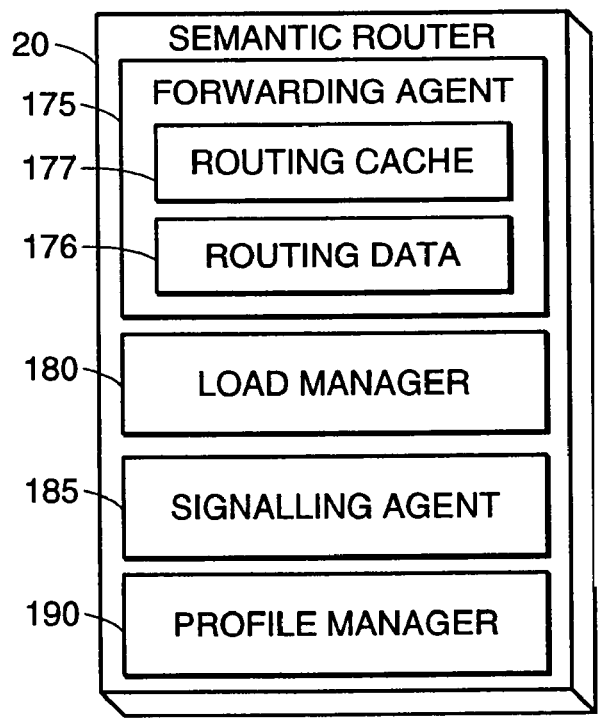
FIG. 6 illustrates the general structure of the semantic router of the present invention.

FIG. 6 illustrates the general structure of the semantic router of the present invention. The semantic router 20 includes, but not by way of limitation, four components. The components included are a forwarding agent 175, a load manager 180, a signaling agent 185, and a profile manager 190. The signaling agent 185 handles the communication of management information between different semantic routers 20. The signaling agent 185 also exchanges routing data 176 with other neighboring semantic routers 20. The signaling agent 185 is used to discover the connectivity of the semantic router 20 to neighboring routers. The forwarding agent 175 forwards semantic packets to neighboring semantic routers 20 based on the data it has about the semantic network. This data includes, but is not limited to, the topology information gained from the exchange of information between neighboring routers, and the interest profiles associated with the links used to connect a given semantic router to the semantic network. Further data may comprise the load information on neighboring semantic routers. This data is called routing data 176. The forwarding agent 175 includes both a routing cache 177 and routing data 176. The routing cache 177 is used to perform a fast lookup of the incoming semantic packet to make a decision as to where the packet should be forwarded. Routing data 176 is used when the lookup in the routing cache 177 fails. The load manager 180 balances the processing load of the semantic router 20. The profile manager 190 aggregates semantic profiles of content consumers.

Several of the above components within the semantic router interact. The load manager 180 interacts with the profile manager 190 to maintain a balance between the processing load and throughput of the semantic router. In the present invention the load manager 180 can simplify the routing profile by reducing the "precision" of the aggregation process carried out by the profile manager 19. Reducing the precision in the aggregated semantic profile gives rise to a semantic profile with fewer elements, which permits a more efficient implementation of the routing method within the semantic router. However, this increase in performance may result in packets being forwarded on a link that are outside the semantic profile for that link. Such packets constitute leakage on the link. Leakage results in the delegation of the processing of semantic packets to neighboring semantic routers. This delegation helps shift the demand for processing from one router to another. Leakage increases the latency of the routing operation of the overall system, since packets are forwarded unnecessarily on links of finite bandwidth. The load manager 180 of the semantic router 20 balances the tradeoff between reduced processing load on a single router against the overall increase in latency of the system. The receiving semantic router 20 can itself decide through its own load manager 180 how much processing it wants to handle. Any particular semantic router may maintain a plurality of semantic profiles with different precisions. Based on the current processing load on the semantic router 20, the load manager may select dynamically, at "run-time", which semantic profile to use for routing the semantic packets. If the processing load on a semantic router is very high then the router can switch to a semantic profile with lower precision and thus delegate the processing load to its neighbors. If on the other hand a semantic router is lightly loaded then it can filter the packets itself more accurately, reducing the burden on its neighbors.

The load manager 180 also checks the processing loads on neighboring semantic routers. The load manager 180 does this by interacting with the signaling agent 185, which in turn interacts with the neighboring semantic routers. By further selecting the level of processing to perform based on the load on its neighbors, each semantic router individually contributes to the optimal throughput and overall efficiency of the network.

Figure 7A:
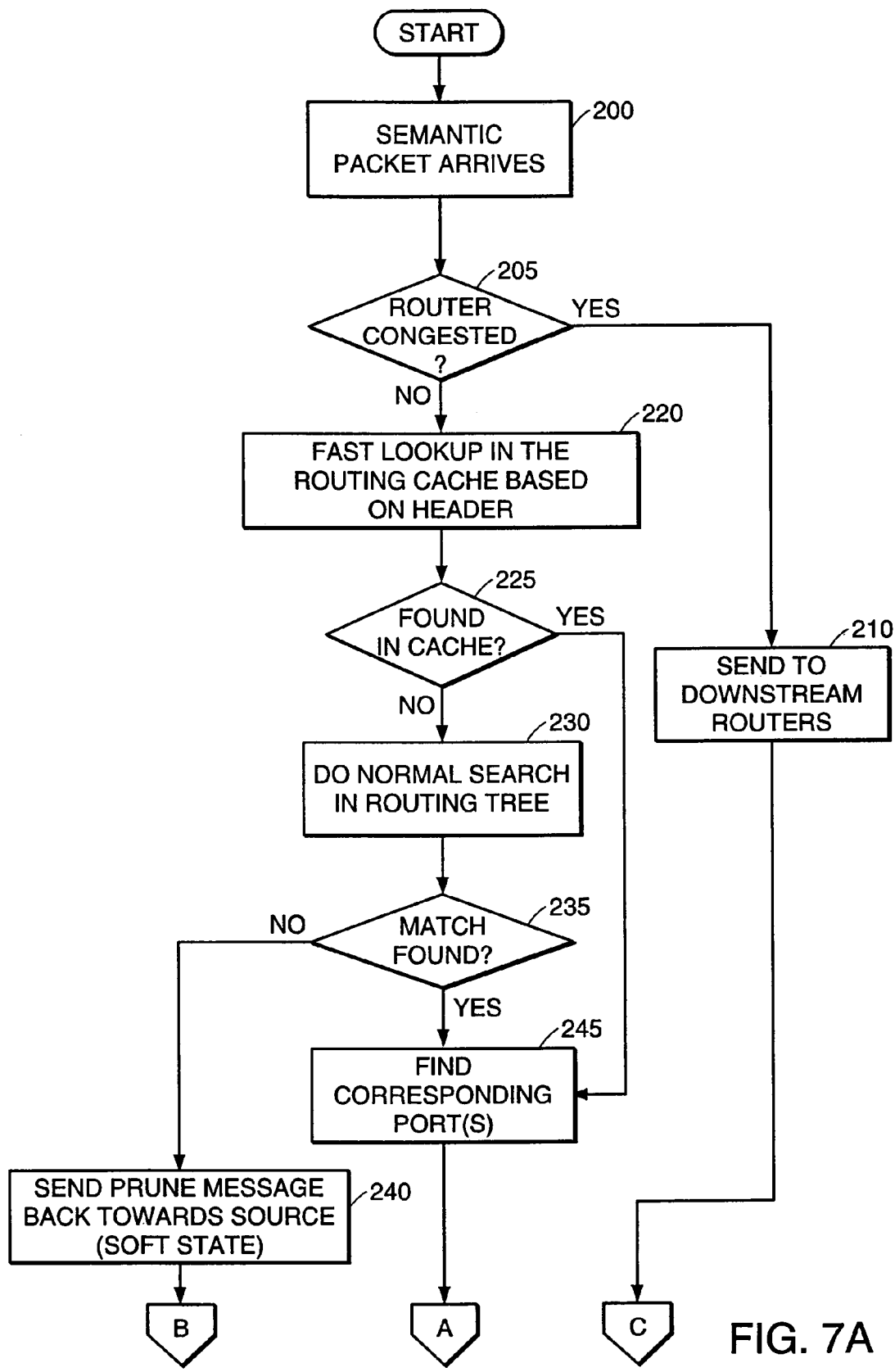
FIGS. 7A and 7B are flow diagrams of the general operation of a semantic router of the present invention.
Figure 7B:
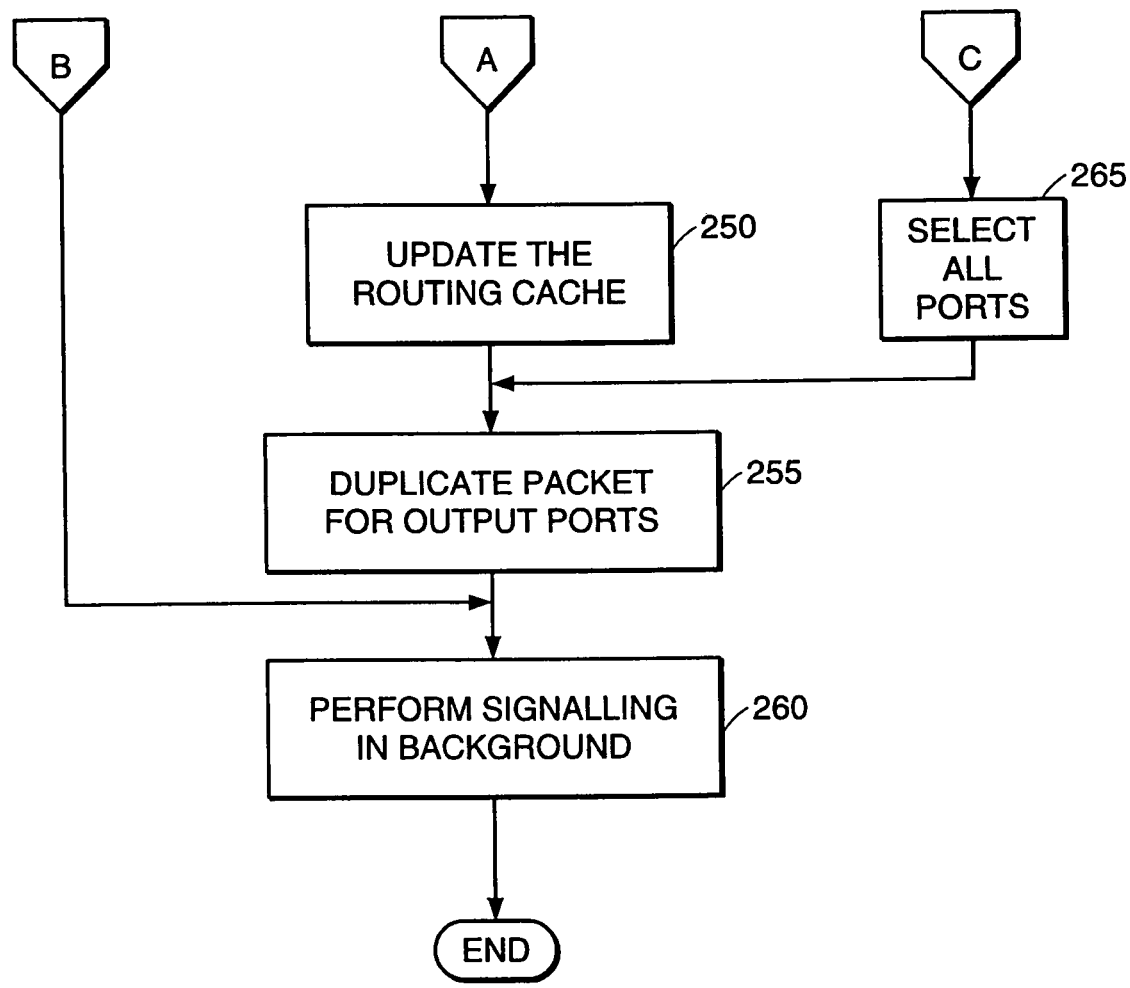

FIGS. 7A and 7B are flow diagrams of the general operation of a semantic router 20 of the present invention. At step 200, a semantic packet arrives at a router. At step 205, the load manager 180 checks whether the router is congested. If the router is congested, at step 210 the packet is sent to downstream routers without further processing. At step 265, all the output ports of the semantic router (that is, all the links to machines other than the machine which sent the packet to this router) are selected and the main processing branch is rejoined at step 255. If, however, the semantic router 20 is not congested, then at step 220, the packet is given to the forwarding agent, which does a fast lookup in the routing cache based on the semantic signatures contained in the semantic packet. The purpose of this fast lookup is to perform a preliminary, but fast, match on the data such that no packets are incorrectly rejected, but packets that will ultimately not pass the filtering process may be rapidly detected. The method of performing the fast lookup has been optimized so that throughput of the semantic router is greater, by reducing the number of packets for which a full filtering operation is required. At step 225, the semantic router determines if the cache lookup operation was successful, and if so, the normal search is bypassed. However, if the fast lookup fails, then at step 230, the semantic descriptors of the packet are searched against the normal routing data. Step 235, determines whether or not a match was found either in the routing cache or in the normal routing data. If the match was not found, at step 240 a prune message is sent back towards the content producer. The prune message notifies the semantic routers on the content producer side not to forward the semantic packets to this semantic router. This prune message reduces the network traffic and contributes to the scalability of the present invention. The prune message is maintained as state information within the semantic router, which expires after a predefined amount of time. When the prune state expires, the semantic routers nearer the content producer side start forwarding semantic packets again towards the semantic router that sent the prune message. The forwarding is again based on the semantic profiles sent by content consumers and other semantic routers linked to the semantic router that sent the prune message.

If a match is found, at step 225 or at step 235, then at step 245 the corresponding routing data entry is read and output ports associated with the entry are identified. At step 250, the forwarding agent, with the help of the load manager updates the routing cache to reflect the port routing decision for the new semantic packet. Updating the routing cache increases the probability that the semantic packets arriving in the future will be matched within the cache. This will be true when there is a high degree of correlation between consecutive, or nearly consecutive, semantic packets, as is likely when the content producer releases related content in 'bursts' of related packets. Exploiting this correlation within the invention increases the overall throughput of the semantic router. At step 255, the semantic packet is then duplicated for the indicated output ports determined at step 250 or step 265. While the above operations are occurring, at step 260 the load manager of the semantic router is further communicating with other semantic routers and the Semantic Log Keeper (SLK) 900 in the background. This process, called signaling, which is explained below in the section entitled "Addition of New Semantic Router to System," involves keeping the router updated regarding the current topology of the semantic network and changes happening to it. The above signaling operation helps to ensure the robustness of the entire network by keeping the semantic routers updated with respect to the contents of neighboring semantic routers' routing data.

Semantic Log Keeper

The Semantic Log Keeper 900 maintains the information necessary to allow producers, consumers and semantic routers to connect together to form the semantic network. When the semantic network is implemented as an overlay network, there are no direct peer-to-peer physical links between the components. The semantic log keeper allows components to connect by providing a known point of contact for the network. All components communicate with the semantic log keeper to retrieve information on the current state of the network. Additionally, components may send periodic messages to the SLK to confirm that they are still connected to the network. Typically, the Semantic Log Keeper function would be implemented in a Management and Operation Station within the network on which the semantic network is running.

Semantic Packet

Figure 8:
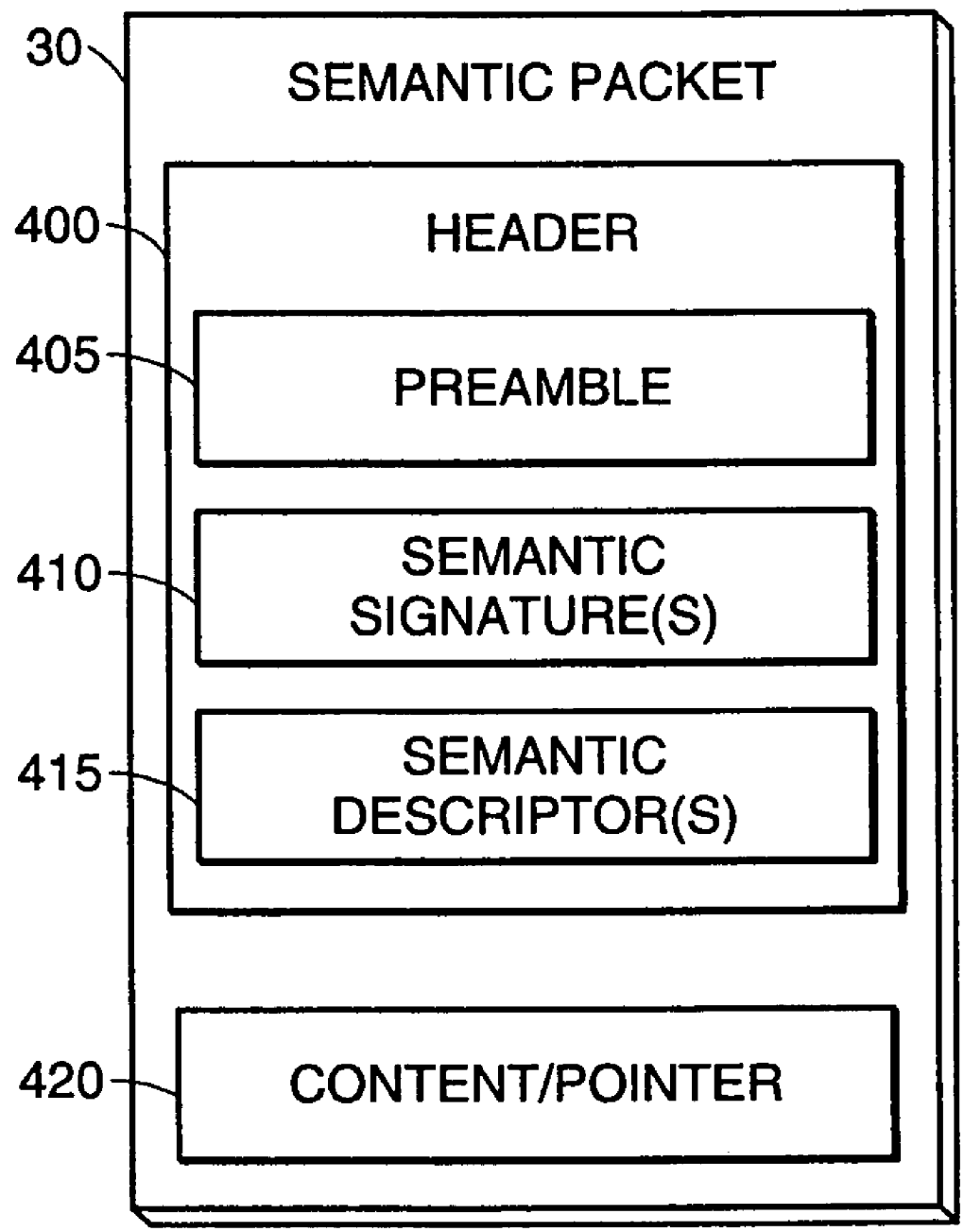
FIG. 8 illustrates the general structure of a semantic packet of the present invention.

FIG. 8 illustrates the general structure of a semantic packet of the present invention. The semantic packet 30 of the present invention includes, for example, a header 400 and content 420. The header 400 of the semantic packet 30 includes, for example, a preamble 405, at least one semantic signature 410, and at least one semantic descriptor 415. Optionally, the header 400 may also include further unspecified fields beyond the Time to Live (TTL) field and sender identification. The preamble 405 may include fields that are anticipated for future extensions, for example to indicate differentiated service classes or security features. The header 400 may be described in a programming language used by the networking community such as, for example but not restricted to, Java or lisp, or a language familiar to the active networking community such as PLAN or Netscript. Alternatively, the header 400 is described in Standard Generalized Markup Language (SGML), or a subset of SGML such as the extensible Markup Language (XML). The semantic signature 410 is used to do a fast lookup in the routing cache of semantic router as described above. The presence of the semantic signature 410 increases the throughput of a semantic router by reducing the processing time required to perform the routing operation on some of the semantic packets. The semantic descriptors 415 are the actual description of the content 420 being routed. The semantic descriptors 415 are used to route the semantic packet 30 when the fast lookup in the semantic router with the semantic signature 410 fails. The content 420 of semantic packet 30 can be the actual content to be consumed or a pointer to content. An example of a pointer, familiar to the networking community, is a Uniform Resource Locator (URL).

Semantic Profile

Figure 9:
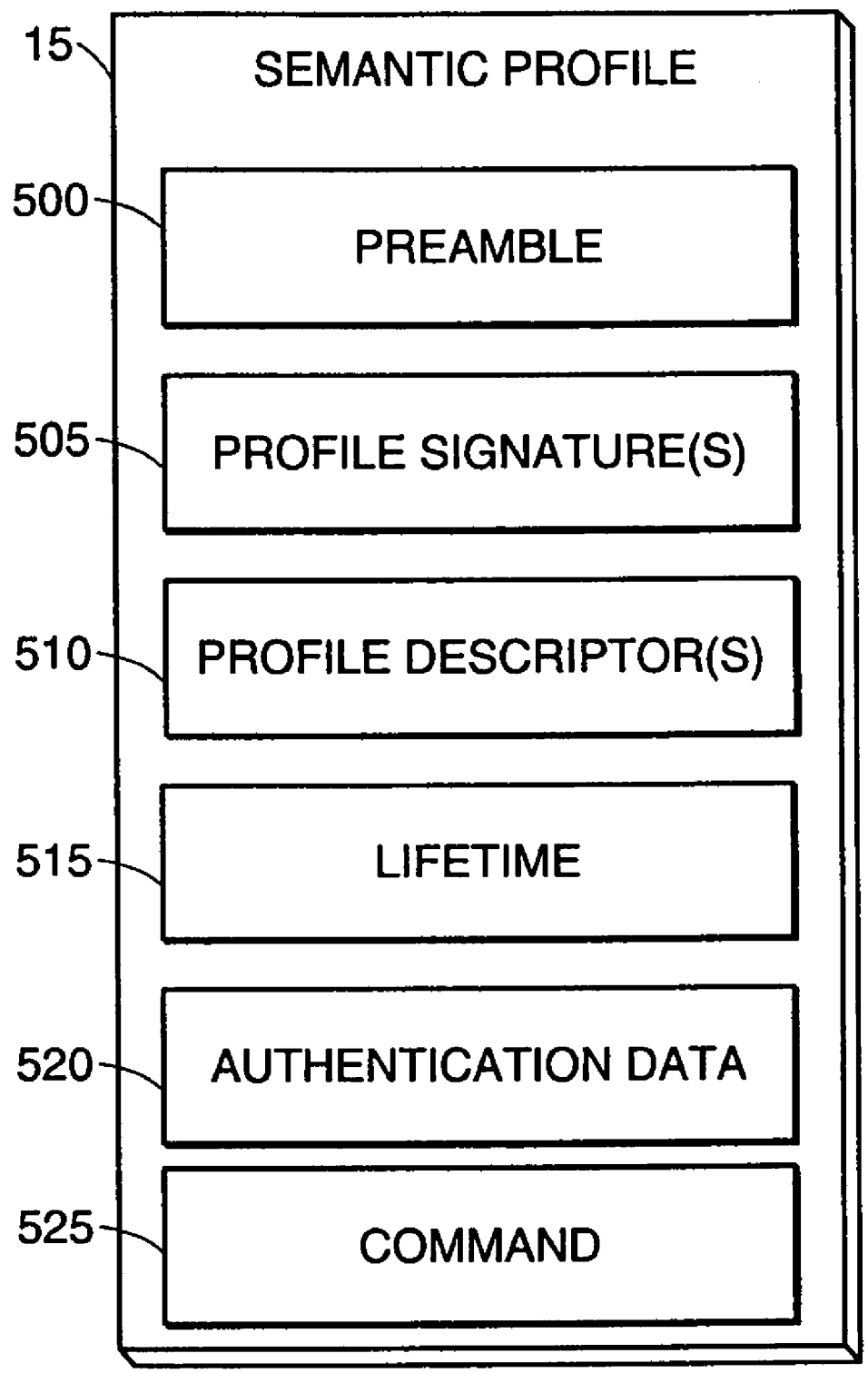
FIG. 9 illustrates the general structure of a semantic profile expressed by a content consumer.

FIG. 9 illustrates the general structure of a semantic profile 15 expressed by a content consumer. The general structure of the semantic profile of the present invention includes, for example, a preamble 500, at least one profile signature 505, at least one profile descriptor 510, a lifetime field 515, authentication data 520, and a command field 525. The preamble 500 of the semantic profile 15 is similar to that of the semantic packet, differing in the value of the command field. One or more semantic profile descriptors 510 are used to convey the content of the actual profile. The profile signatures 505 are used to locate an existing semantic profile through the network in the case when the interest profile is being updating from an existing profile. The semantic profiles are stored for a limited amount of time as indicated by the lifetime field 515. The profile becomes invalid after the time specified in the lifetime field 515 expires. The semantic profile needs to be refreshed before expiry with new a semantic profile 15 to keep it valid. The profile signature 505 is used to locate an existing profile and so determine whether the profile has expired or not. The authentication data 520 is provided to verify the identity of the semantic profile 15. The authentication data prevents malicious users from invalidating a genuine semantic profile 15. Alternatively, the contents of this field can be processed within the semantic router and the content consumer in conjunction with further authorization information held by the two parties to perform a mutual reputation or background check of the parties involved. This can yield a trust relationship whereby the content consumer feels entitled to believe that the information supplied by the semantic router has not been maliciously altered since it was supplied by the content provider. The command field 525 contains information for the semantic router about the method by which the semantic router is to process the contents of the semantic packet. Alternatively, the command field 525 can be extended to include additional commands. For example, the command field 525 may indicate that the authentication data 520 are to be used as a digital signature to verify the user with a third party database. As a further illustrative example, the command field 525 may indicate that the authorization field identifies one or more users to be blacklisted, such that those users are subsequently excluded from the semantic network after the reputation check with the third party database.

Semantic Profile Aggregation

Figure 10:
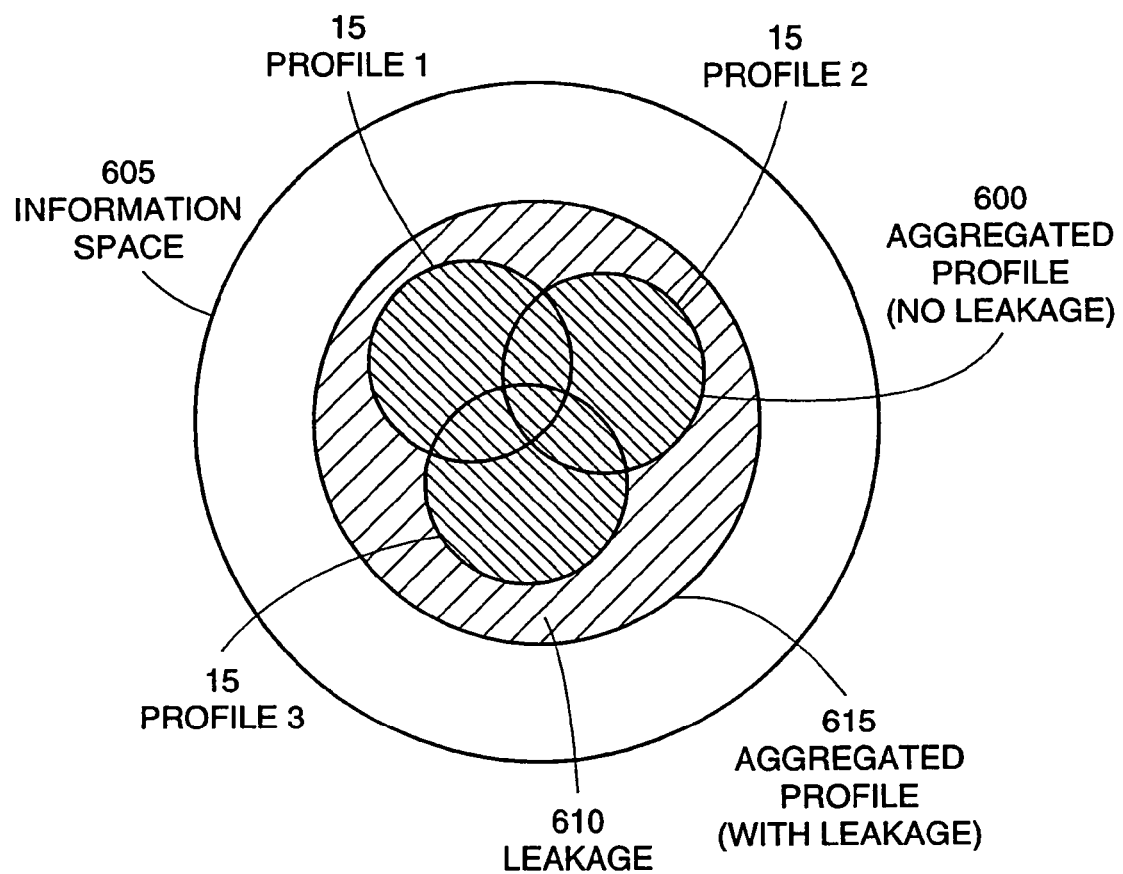
FIG. 10 illustrates an example of an aggregated semantic profile.

FIG. 10 uses Venn Diagrams to illustrate an example of an aggregated semantic profile. A semantic profile 15 contains an interest profile of a content consumer. The interest profile is in essence an expression of the type of content the content consumer would like to consume. An example of an interest profile would be if content consumer A was interested in baseball but only in games involving the New York Yankees™. However, the semantic profiles 15 of content consumers may overlap because of the existence of a high correlation between the interests of content consumers. As an extension of the above example, content consumer A's interest profile (profile 1) may overlap with other content consumers' interest profiles (profile 2 and profile 3). If another content consumer, say B (profile 2), was interested in major league baseball but only in teams from the American League Eastern Division and yet another content consumer C (profile 3) was interested in only baseball teams in the American League, content consumer A, B, and C semantic profiles 15 would overlap with respect to content relating to the Yankees. In FIG. 10 the aggregated profile 600 is shown with a dark solid line.

The aggregation of profiles is more efficient than just the summing of profiles. The efficiency is the result of a high degree of correlation between different individual profiles. The method of aggregating profiles in the present invention contributes to the scalability of the overall system. By aggregating, the total number of profiles in the semantic network is reduced. The idea of aggregating semantic profiles is analogous to subnetting and supernetting in the conventional IP networks. The aggregated profiles for each link at each semantic router are stored as the routing data, which in turn is used to route the semantic packets.

Optionally, the aggregation of semantic profiles may not be precise. The precision of the aggregation depends upon several factors, one of which is the processing load of the semantic router. When the aggregation of semantic profiles is not precise, some additional information 610, termed leakage, in the information space 605 may get propagated with the aggregated semantic profile 15. Because of leakage, semantic packets (i.e., content) not specified 615 by the content consumer's semantic profile 15 may actually be forwarded towards the content consumer. In the instances that the aggregation of the semantic profiles is precise, no such additional semantic packets are forwarded toward the content consumer.

To express the semantic profile in a semantic network, there has to be a representation of that profile within the network. This representation is termed a schema. These schemas must be flexible allowing the addition/deletion/modification of a profile when desired. One embodiment of such a schema allows a profile to be expressed as a tree. The root of the tree is a root node, for example identifying a Semandex root node. A path from this root towards the leaf of the tree is one component of a particular profile. An example of such a profile, expressed in the markup language XML is:

```
<?xml versopm="1.0"?>
<rdf:RDF
Rdf="http://www.w3.org/1999/02/22-rdf-syntax-ns#
Op= http://schema.semandex.net/operations/1.0"
Sx="http://schema.semandex.net/sports/1.0">
    <op:OR>
        <sx:Sports>
            <sx:Game>Baseball</sx:Game>
            <sx:Game>Basketball</sx:Game>
        </op:OR>
    </sx:Sports>
    <sx:Sports>
            <sx:Game>Soccer</sx:Game>
    </sx:Sports>
    </op:OR>
</rdf:RDF>
```

Figure 11:
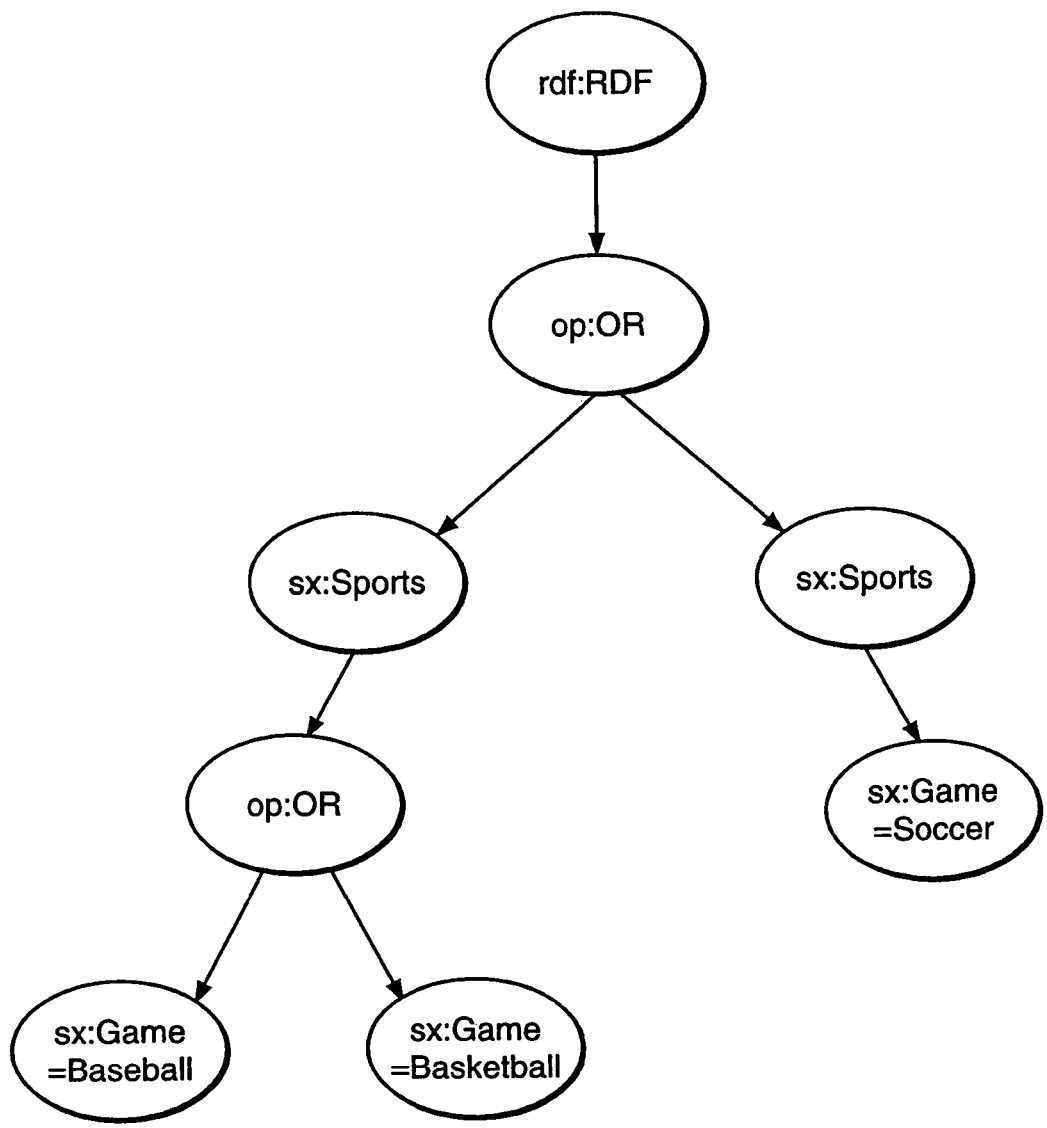
FIG. 11 is an illustration of the tree structure of an aggregated profile.

As illustrated in the above profile example, there may be more than one schema associated with the profile. In this example, one schema (op: http://schema.semandex.net/operations/LO) is the common-to-all schema for the operators which logically combine different profiles. The other schema is the sports schema (sx:http://schema.semandex.net/sports/LO) which is specific to the information space. FIG. 11 is an illustration of the tree structure for the above profile where various paths (from root) represent the components of the schema that are combined by operators. The method for aggregating profiles in the current invention is the processing of the logical operators in such a way that the resultant expression is simplified (with fewer nodes or operations) than the original.

These profiles can change with time. The frequency of change is variable depending upon the type of desire expressed in a profile. For instance, some desires are short-term. An example of such a desire is query to buy an item at a certain price. Once the item is purchased, there is no need to maintain that desire in the content consumer's profile. On the other hand, some desires are long term. This happens when a content consumer's interest changes over a period of years. Then there are profile changes that lie between these two extremes. An example of a long term profile is a content consumer's interest in "televised sports". Such an interest is long-term and stays almost constant with time. This may be contrasted with a short term profile in the same information space such as an interest in the "televised Olympics" which only comes around every two years and last for only a few weeks each time. This desire is not continuous as the previous one. Once the Olympics television content has been consumed and the Olympics are over, the content consumer may no longer be interested in information about them. Then there are even shorter term desires like "looking for specific golf advice". Once the advice is found, there is no need to keep that interest in a profile.

Aggregation of profiles provides the following advantages which contribute to the scalability of the present invention: (i) it exploits the correlation between numerous individual profiles; (ii) it simplifies and speeds up the routing operation at semantic routers; (iii) it reduces the amount of storage required at the semantic routers; (iv) it achieves subnetting based on aggregated profile; and (v) it achieves scalability in routing.

Figure 12:
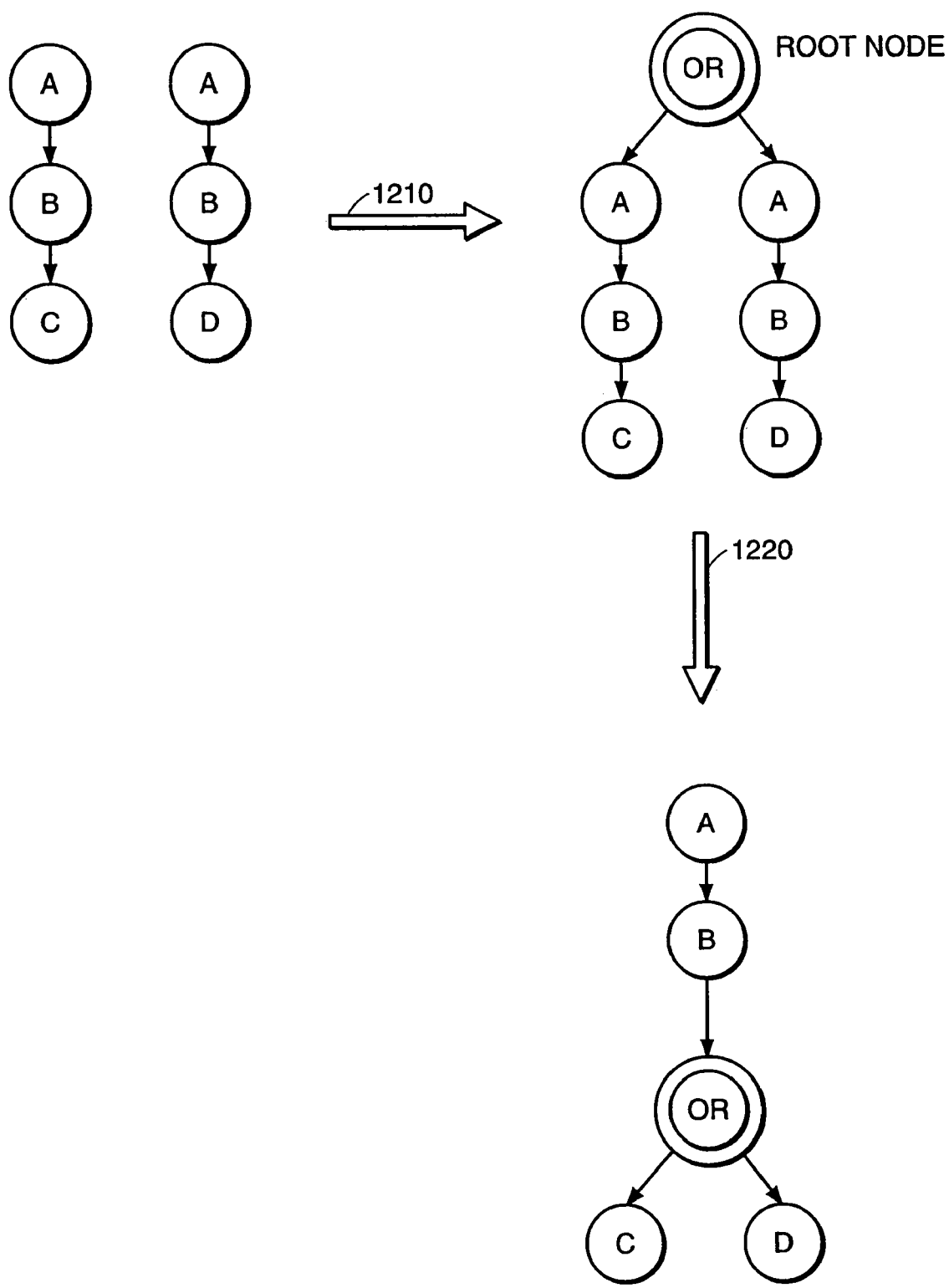
FIG. 12 illustrates the combining of profile subtrees with advanced profile aggregation.

The simplest possible way of merging a plurality of profiles is to use the Boolean "OR" operator and put two or more profiles under it. An example of this is shown at step 1210 in FIG. 12. However, to gain all of the advantages mentioned above, the simple method of combining profiles through addition of logical "OR" nodes is not sufficient because it does not reduce the total complexity of the profile data. Additionally, following step 1210, by starting from the root node, it is possible to traverse common paths in the source profiles. Wherever the profiles differ, a common "OR" operator node is created in the destination profile and the separate paths on the source profiles are attached to that node. An example of this is shown at step 1220 in FIG. 12. The path containing nodes A and B is common to both profiles. The two profiles differ at nodes C and D. According to this aspect of the method of the present invention, a common "OR" node is created below node B and the two nodes C and D are attached below the common "OR" node. It will be readily appreciated by those skilled in the art that other forms of logical operation are possible and that the joining is not limited to only two child nodes for a single operation.

The invention makes further simplifications through the application of Boolean algebra. For example, the invention exploits the possibility that a logical "OR" may encompass the whole of the information space at that point. For example, joining by a logical "OR" operation two nodes, one of which tests that a value is positive (value>0) and the other of which tests that a value is below 1 (value<1), generates a condition that is always TRUE. Such a node can be deleted from the destination profile. To achieve this, and other improved aggregations, the high-level algorithm is as follows:
1. Traverse the paths from root in individual profiles while they are same.
2. Once the profiles differ, put a common OR node at that place.
3. The individual profiles are then attached as child of these common OR parent.
4. On these combined tree, apply some Boolean simplification rules.

If the simplification rules generate a logically equivalent tree, the results of matching the profile with the content will be the same for both trees. Alternatively, the simplified tree may match more content that the original tree. For example, if the two tests (value$\leqq$0) "OR" (value$\geqq$1) were combined by deleting the "OR" node in the tree, then values in the range (0>value>1) would pass the comparison in the simplified tree. Such simplifications generate leakage, additional packets being forwarded, at the expense of faster matching. The decision to introduce leakage is further determined by the distribution of the values in the sample space of documents. In the previous example, if the tests were designed to capture only the outlying values from a distribution having most values between 0 and 1, then such a simplification would greatly increase the network traffic.

Conventional computer programming languages, such as FORTRAN and C, are designed and optimized for the procedural manipulation of data (such as numbers and arrays). Humans, however, are believed to solve complex problems using very abstract, symbolic approaches that are not well suited for implementation in conventional programming languages. Although abstract information can be modeled in these languages, considerable programming effort is required to transform the information to a format usable with procedural programming paradigms. Research in the area of artificial intelligence has led to techniques, embodied in programming languages or computer-based tools, which allow programs to be built that closely resemble human logic in their implementation and are therefore deemed suitable to solve these complex problems. Typically, these programs, which emulate human expertise in well defined problem domains, are called expert systems.

Rule-based programming is one of the most commonly used techniques for developing expert systems. In this programming paradigm, rules are used to represent heuristics, or learned behaviors, which specify a set of actions to be performed for a given situation. Typically in such a system, a rule is composed of an if portion and a then portion. The if portion of a rule is a series of patterns which specify the facts (or data) which cause the rule to be applicable. The process of matching facts to patterns is called pattern matching. The expert system tool provides a mechanism, called the inference engine: which automatically matches facts against patterns and determines which rules are applicable. The if portion of a rule can further be thought of as the whenever portion of a rule since multiple patterns may be matched for a given arrangement of facts. The then portion of a rule is the set of actions to be executed when the rule is applicable. The actions of applicable rules are executed when the inference engine is instructed to begin execution. The inference engine selects one or more matching rules and then the actions of the selected rules are executed (which may affect the list of applicable rules by adding or removing facts). The inference engine then selects further rules and executes their actions. This process continues until no applicable rules remain.

As an example of such an expert system programming language, the Java Expert System Shell (Jess) is a rule engine and scripting environment written entirely in Sun's Java language by Ernest Friedman-Hill at Sandia National Laboratories in Livermore, Calif. Jess was originally inspired by the C Language Integration Production System (CLIPS) expert system shell. As an embodiment of the present invention, the Jess system is used to encode Java applets and applications that comprise such an expert system using knowledge supplied in the form of declarative rules. In the context of the present invention the Jess system enables the following method to be implemented: (i) all nodes of the profile trees are represented with facts; (ii) simplification rules are written in Jess language which transform the facts; (iii) tree nodes are implemented as software components in the Java programming language which easily integrate with the Jess representation of facts, so all the operations on facts can be reflected on these nodes; and (iv) new rules are added to the expert system expressed in the plain text of the Jess representation.

An example of an algorithm for aggregating semantic profiles is as follows:

1. parse the profile file using a suitable parser for the profile representation.
2. create and initialize a new node in the profile tree for each element of the profile.
3. create a Jess fact associated with each node in the representation tree.
4. read in a rule file expressed in the Jess rule language
5. run the inference engine which will select one or more matching rules and execute the actions associated with those rules
6. associate Java methods with the actions of a particular rule, such that the corresponding Java method transforms the node or tree according to the simplification expressed by the rule.
7. exemplary transformations of the nodes performed by the methods include addChild, removeChild, deleteChild and setParent
8. exemplary transformations of whole subtrees performed by the methods include merge, removeDuplicate and attach
9. expert system rules are matched by comparing the name, value, parent, label or children of the nodes.

An exemplary Jess fact representing a node in the tree would appear as:

(profile (name op:OR) (value " ") (parent 19607) (label 10929)
(children 19034 12349))

An exemplary rule to remove duplicate nodes would be written in the following idiom:

```
(defrule remove-duplicate "remove duplicate nodes having same
name value, children"
?f1 <- (profile (name ?n) (value ?v) (parent ?p1) (label ?l1)
(children $?c))
?f2 <- (profile (name ?n) (value ?v) (parent ?p2) (label ?l2)
(children $?c))
(test (neq ?f1 ?f2))
=>
(progn
(printout t "remove duplicate" ?f1 "and" ?f2 crlf)
(call ?l1 removeDuplicate ?l2 ?p1 ?p2)
(facts)))
```

The rules are composed from simple operations to perform complex transformations. These operations are done by modifying a fact when a rule is selected; which in turn may cause the selection of further rules. This chain of rules result in an overall transformation of the tree. The present invention embodies a set of simple rules which when combined give rise to complex transformations resulting in an overall simplification of the tree.

Figure 13:
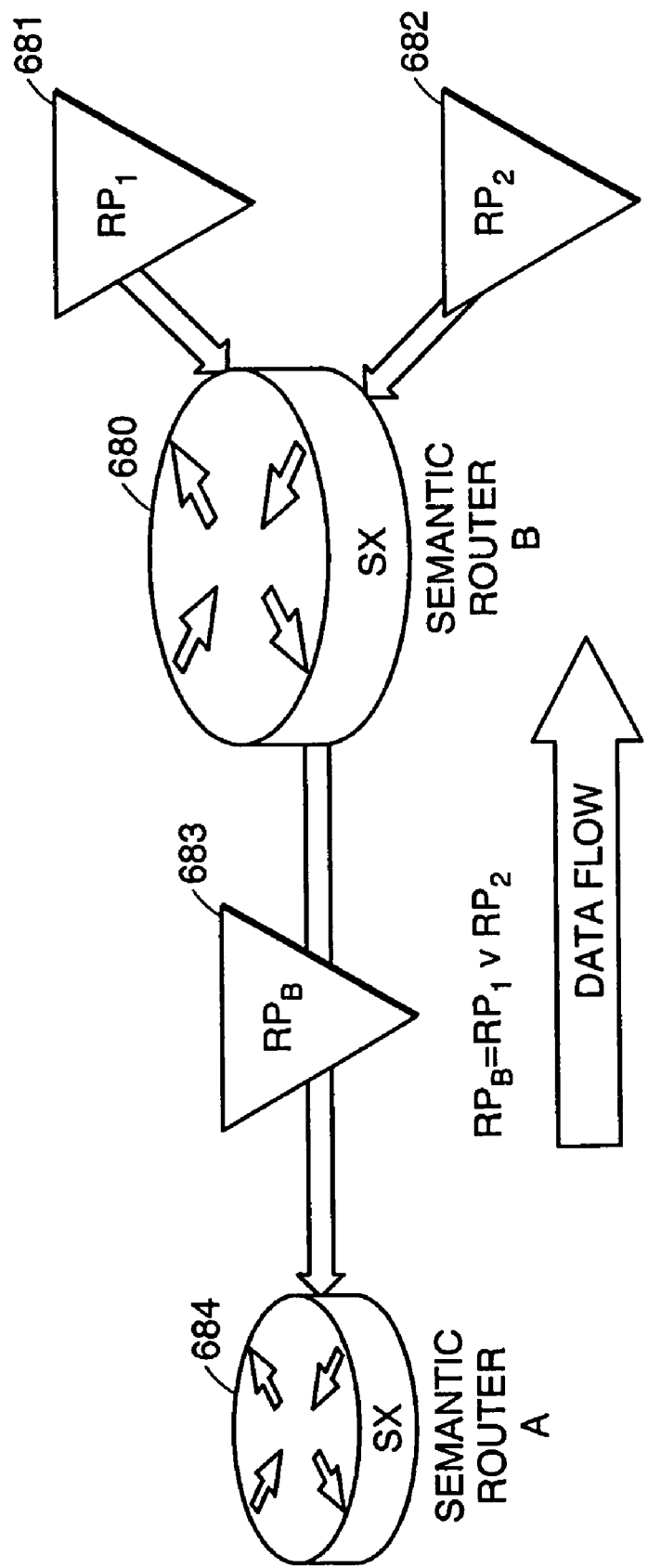
FIG. 13 illustrates an example of the general operation of the aggregation engine.

An aggregation engine is implemented at each semantic router in the network. The profiles coming from a set of input ports are aggregated by each engine and sent to all the output ports. This same operation is performed at all the semantic routers. When a particular semantic router receives the profile on an input port, it associates that profile with the port. When some data come, the router compares the profile against the data and sends the output on that port if there is a match between the content of the data and the profile for the port. If there is nothing common between the data and profile, then nothing is sent on that port. FIG. 13 illustrates the above point. Semantic router B 680 aggregates profiles $RP_1$ 681 and $RP_2$, 682 resulting in $RP_B$ being sent to semantic router A 684. The semantic router A associates the profile with the port connecting A to B. When some data come to Semantic router A 684, it compares the content against the profile $RP_B$ 683. If there is a match then the output is sent to semantic router B 680. The semantic router B 680 in turn would compare the data against the profiles $RP_1$ 681 and $RP_2$ 682 and forward the data accordingly.

Content Producer

Figure 14:
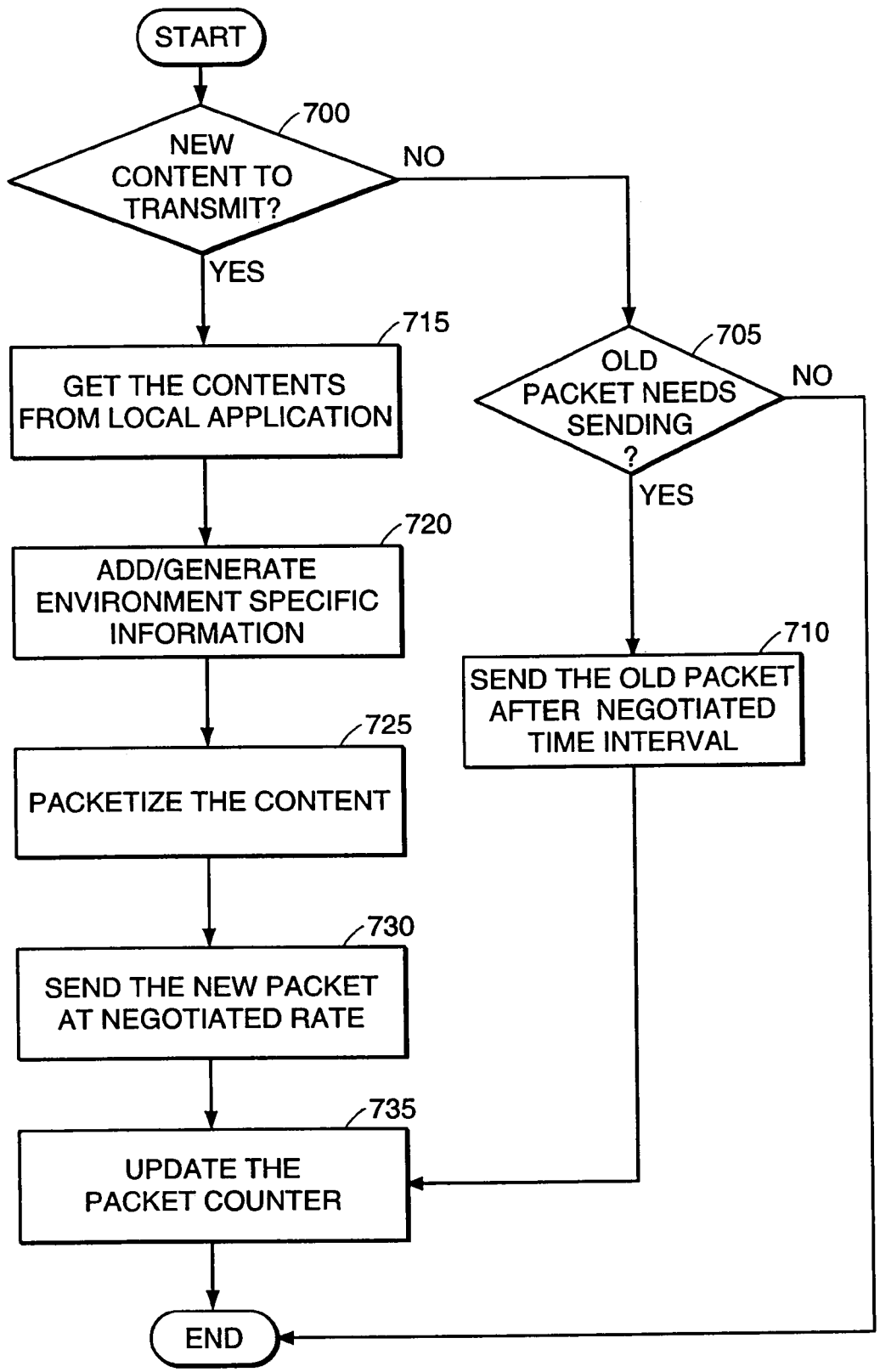
FIG. 14 illustrates the general operation of a content producer.

FIG. 14 illustrates the general operation of a content producer. At step 700, the content producer checks if there is some new content to be transmitted. If there is no new content then at step 705 it checks whether an old packet needs to be sent again. If a packet does not need to be sent again then the producer does nothing and returns to waiting for new content to be produced. If a packet needs to be sent again then at step 710 it sends the old packet after a negotiated time interval. If there is some new content determined at step 700 then at step 715 the content is retrieved from the local application. At step 720, the content is processed to derive the semantic content description and the semantic signature. The semantic descriptor describes the semantics of the content. Alternatively, the semantic descriptor has additional placeholder fields. These placeholders can be utilized and/or customized by the application running on top of the semantic network. The placeholders, if needed, are filled with environment specific information, at step 720. The semantic signature is calculated for the semantic descriptor and the content. This semantic signature is utilized by the forwarding agent to efficiently and promptly route the semantic packet in the network. At step 725, the information calculated or derived in step 720, together with the original content, are combined to form a single semantic packet. At step 730, the semantic packet is sent at the negotiated rate to all the neighbors of the semantic router. At step 735, a packet counter is updated for use by the load manager.

Content Consumer

Figure 15:
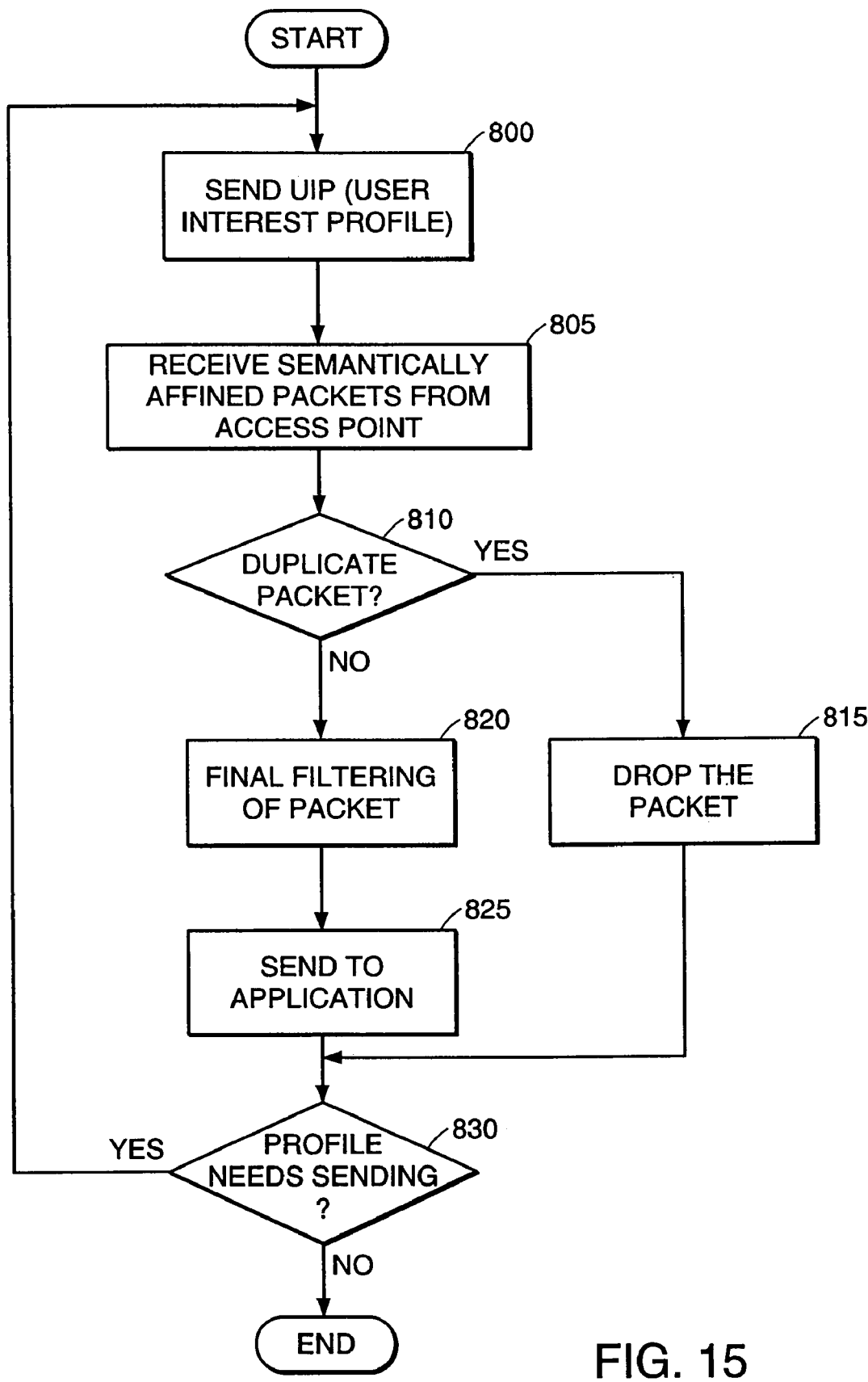
FIG. 15 is a flow chart illustrating the general operation of the content consumer.

FIG. 15 is a flow chart illustrating the general operation of the content consumer. At step 800, the content consumer generates a semantic profile, called a user interest profile (UIP), and injects this semantic profile into the semantic network. Alternatively, the User Interest Profile represents a number of areas of interest and is an aggregated profile generated by the method described above. The semantic network routes packets that match a content consumer's semantic profile according to the method of FIG. 14. At step 805, the content consumer receives these semantically affined packets from semantic routers. At step 810, the content consumer determines whether the packet is a duplicate one, using identification or sequencing fields commonly employed by communication network protocols. If the packet is determined to be a duplicate, at step 815 the packet is silently dropped. Step 810 ensures that the application running on top of semantic network does not get burdened with redundant and duplicate information. If the packet is determined not to be a duplicate at step 810, then at step 820 the packet is filtered by a filter in the content consumer peer client. Step 820 ensures that any packets transmitted on the link as a result of leakage introduced by the profile aggregation method described earlier are not delivered to the content consumer. The filtering proceeds by applying an exact matching algorithm between the semantic content descriptor of the packet and the user interest profile of the consumer. At step 825, the packet is then delivered to an application. The type of application is not specified within the scope of this invention. Exemplary applications would include electronic mail storage systems, Web browsers, automated order processing software, and other general purpose data-processing applications. At step 830, the content consumer determines whether or not it is time to refresh its user interest profile within the network. If the profile needs to be refreshed, or modified, then at step 800 the profile is sent again otherwise the content consumer goes back to receive mode for the semantic packets.

Client and Semantic Router Interaction within System

Figure 16:
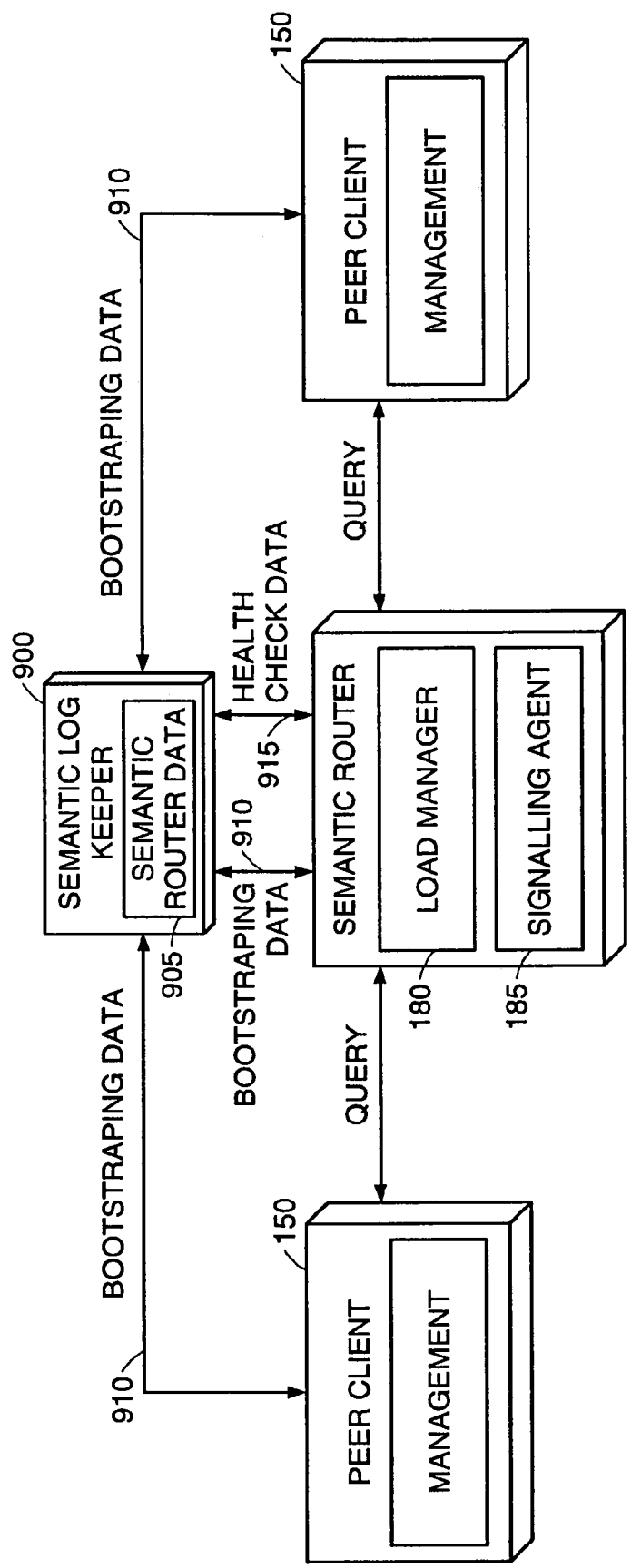
FIG. 16 is a block diagram illustrating the general management operations occurring between a peer client and a semantic router.

FIG. 16 is a block diagram illustrating the general management operations occurring between a peer client 150 and select components of a semantic router 20. Both the peer client 150 and the semantic router 20 interact with the semantic log keeper (SLK) 900 for bootstrapping operations. The SLK 900 maintains the semantic router data 905. When a peer client 150 or the semantic router 20 is brought into the semantic network, it contacts SLK 900 for bootstrapping data 910. The management module in the peer client 150 handles the interactions with the SLK 900. The peer client 150 and the semantic router 20 use this data to gain an initial understanding of the network. The peer client 150 can use the data in the SLK 900 to query nearby semantic routers 20. The query responses allow the peer client 150 to find one or more suitable semantic routers 20. The semantic routers 20 also use the bootstrapping data 910 to find one or more suitable neighbors. The semantic routers 20 interact with each other using their signaling agent 185. The load manager 180 in the semantic router 20 monitors the processing load on the semantic router 20. Information regarding the processing load can be conveyed to SLK 900 as health check data 915. The profile manager interacts with the signaling agent to exchange profiles with the neighbor semantic routers 20.

Addition of New Client to System

Figure 17:
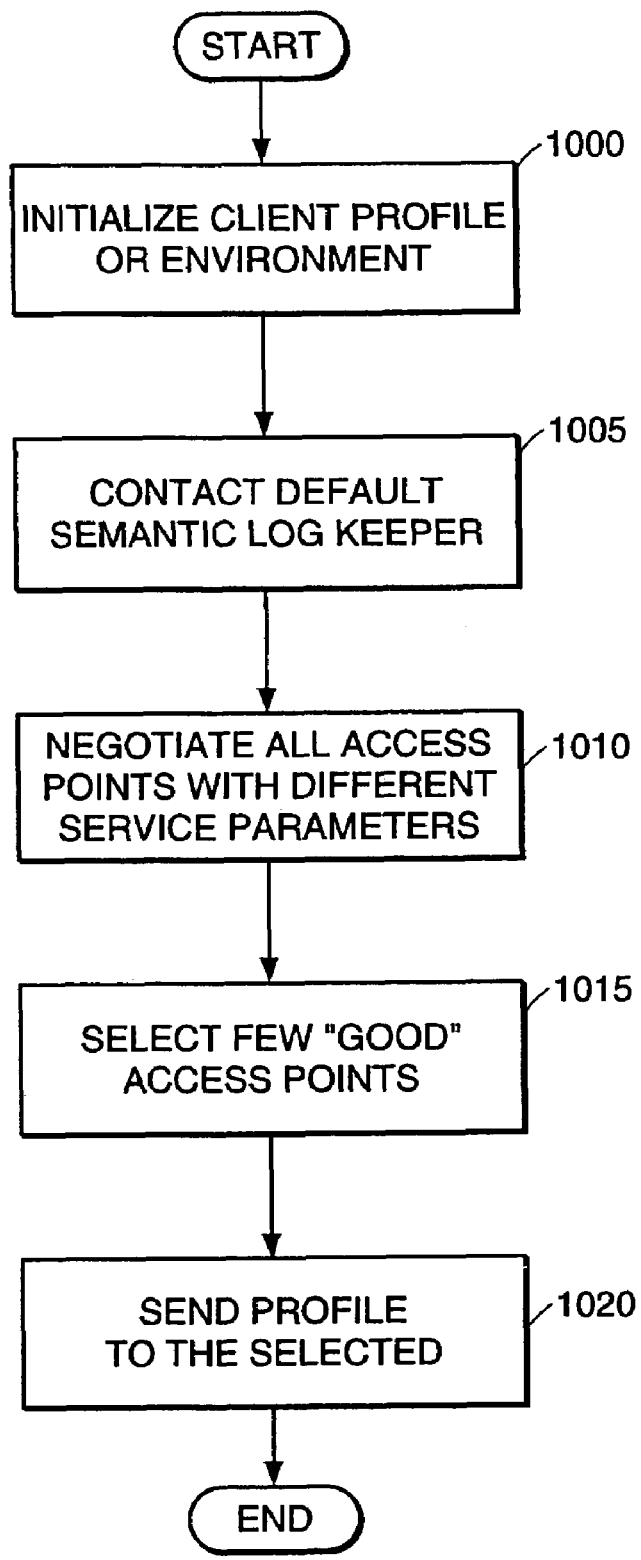
FIG. 17 is a flow chart illustrating the addition of a new client to a semantic network.

FIG. 17 is a flow chart illustrating the addition of a new client to a semantic network. At step 1000, the client environment is initialized. At step 1005 the SLK for the semantic network is contacted. The SLK contains knowledge about the current topology of the semantic network as supplied by the semantic routers already present in the network according to the method of the previous section. The SLK provides a subset of these data to the new client. Using these data at step 1010, the peer client can determine a suitable point of attachment into the semantic network by querying different semantic routers for a set of service parameters. Based on the responses from the queried semantic routers, at step 1015 the peer client can select a suitable semantic router to which to connect. Suitability is determined by the particular client. Examples of service parameters that may determine suitability include network proximity, semantic affinity, and physical proximity. In the case of content consumers, the processing continues with step 800 of FIG. 15. In the case of content producers, the content is sent to the selected semantic router.

Once the client has established links to one or more neighbors the communication proceeds according to the above methods. If the client loses contact with the semantic network, because of node or link failure, the initialization process resumes at step 1005.

Addition of New Semantic Router to System

Figure 18A:
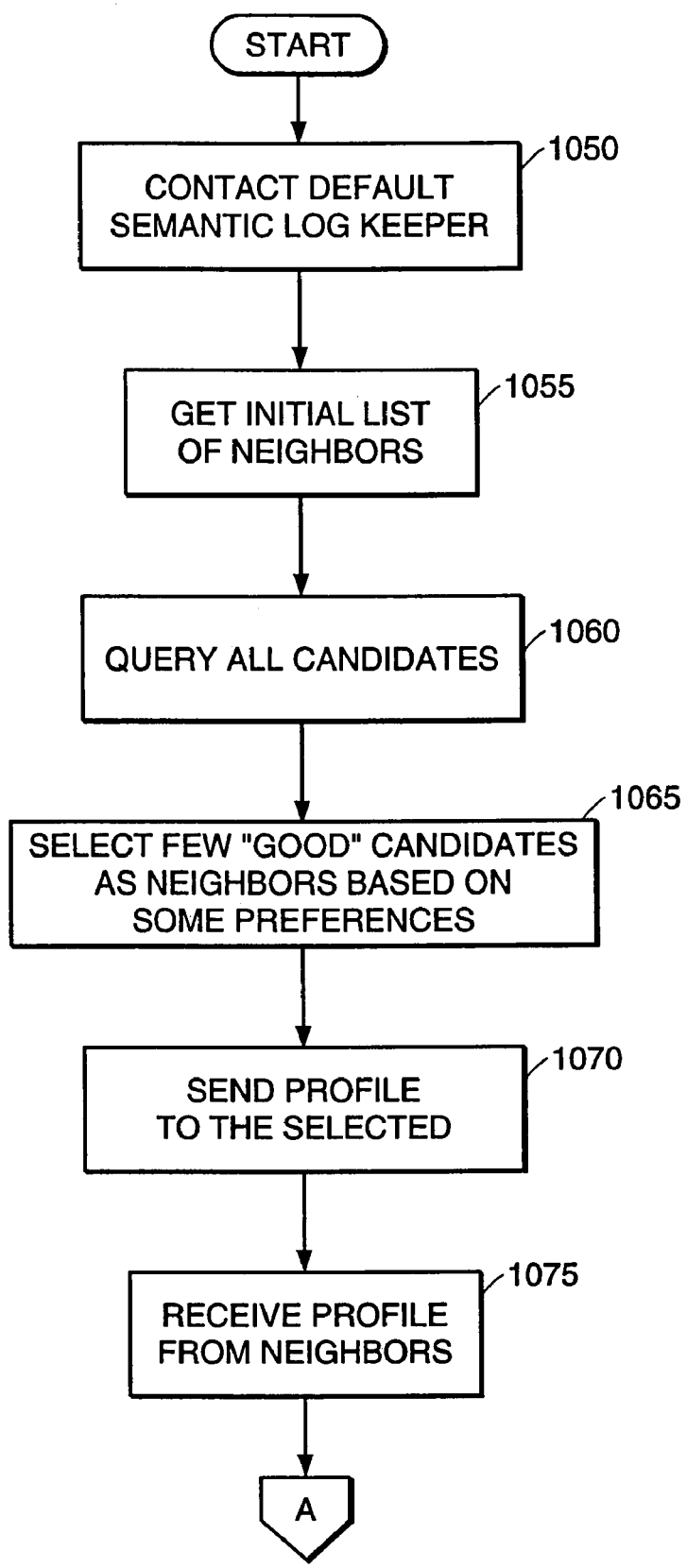
FIGS. 18A and 18B are flow charts illustrating the addition of a new semantic router to a semantic network.
Figure 18B:
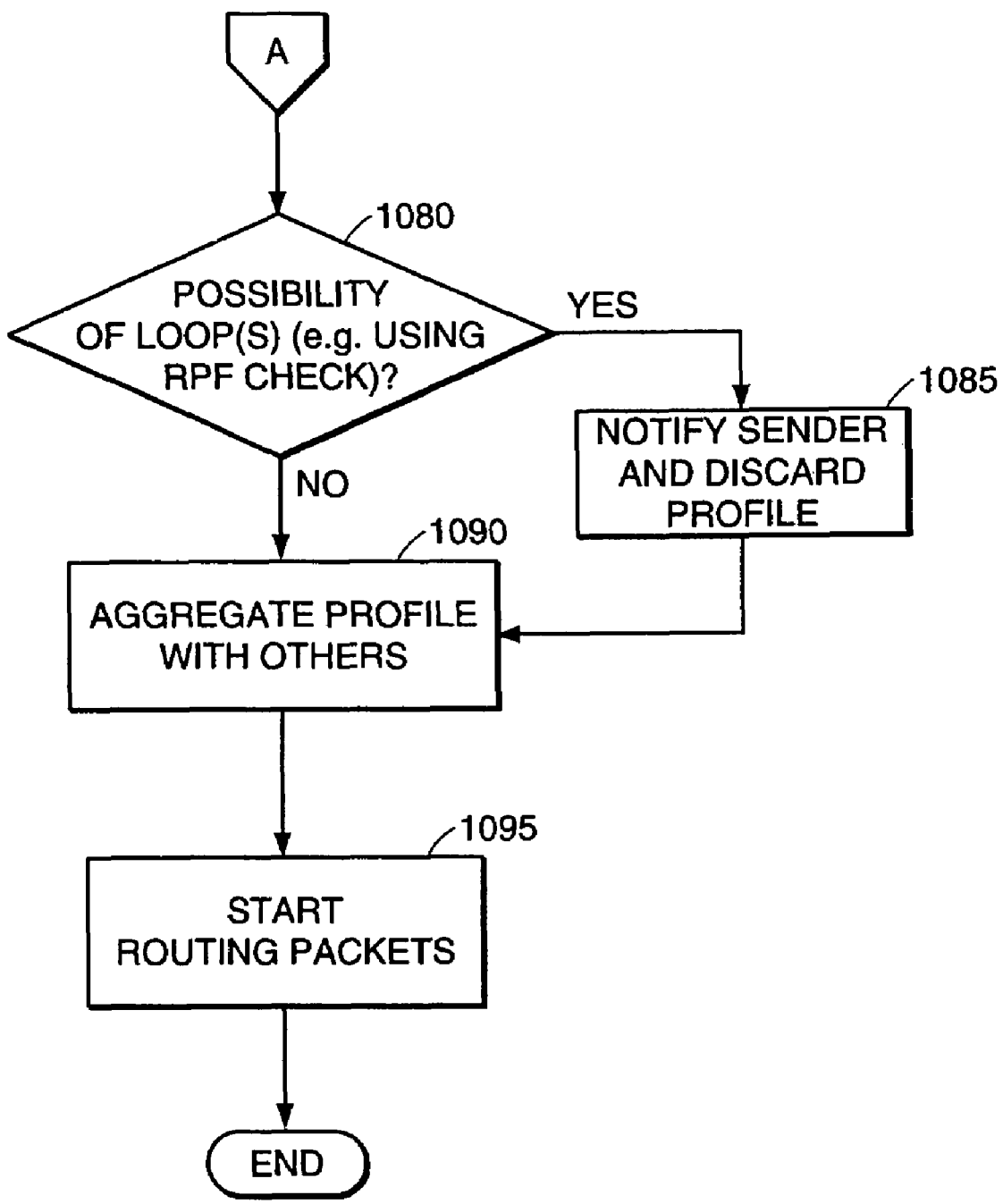

FIGS. 18A and 18B are flow charts illustrating the addition of a new semantic router to a semantic network. At step 1050, the new semantic router contacts the default SLK for the semantic network. The SLK returns a subset of its information to the semantic router sufficient to allow an initial list of potential neighbors to be formed at step 1055, based on these bootstrapping data. At step 1065, the neighbors in the list are queried to determine the parameters of their current state, for example load and profile settings. At step 1065 one or more of the responding potential neighbors are selected as actual neighbors based on the administrated preferences of the particular network. At step 1070, the new router establishes links to its neighbors, thereby creating ports in its local routing environment. Creating the links will cause the profile managers of neighboring semantic routers to initiate a set of profile exchanges. At step 1075, the semantic profiles are received from those neighbors. At step 1080 the profile manager executes a loop prevention check. A loop occurs when the same packet is routed in such a way that it continues to circulate in the network. The check can be performed, for example, using the method of the Reverse Path Forwarding (RPF) check done in Multicast routing protocols as specified by the Inter-Domain Multicasting Routing (IDMR) group of the Internet Engineering Task Force (IETF). A loop can occur because of incorrect semantic profile updates creating a topology in the semantic network that permits packets to circulate. If the profile manager finds any possibility of loops then at step 1085 it notifies the sender and discards the offending semantic profile sent by that sender. If loops are not going to be formed then the semantic profile is aggregated at step 1090. The aggregated profiles are sent to all neighbors. The routing data are updated to reflect the changes in the profiles. The SLK is informed of the new topology and further health check data so that new clients and new routers get the correct information during the neighbor discovery process.

The load manager provides input on how semantic profiles are aggregated. If the processing load on a particular router is high, the semantic profiles may be aggregated with less precision. If the aggregated profile is the Boolean OR of a large set of discrete individual profiles (i.e., little or no overlap between different individual profiles, and no leakage) then the processing load for the filtering operation on the upstream semantic router towards the content producer is high. If, on the other hand, the aggregated profile is very broad and superficial (i.e., not precise and with a large proportion of leakage), the upstream filtering can be performed with little processing load, but there will be a lot of unwanted traffic coming towards the current router. The load manager considers all the above factors and strikes a balance between the processing load of the individual router and the throughput of the system as a whole. All the load balancing operations continue in the background. In the foreground the semantic router starts routing packets, at step 1095.

Non-Overlay Semantic Router Architecture

Figure 19:
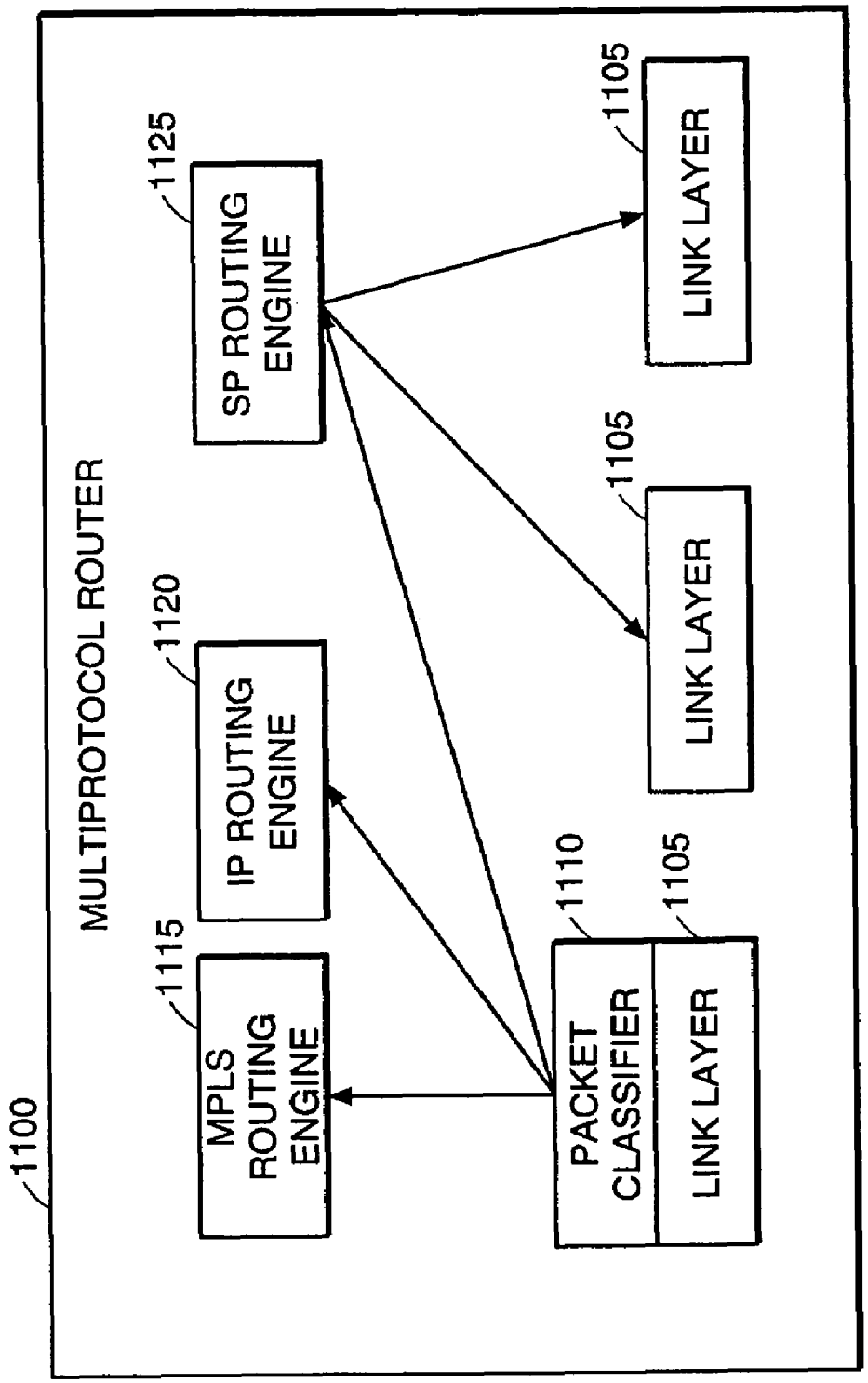
FIG. 19 illustrates the general architecture for a semantic router of the present invention that can be deployed in a network.

FIG. 19 illustrates the general architecture for a semantic router of the present invention that can be deployed in a non-overlay network. This architecture contains a multi protocol router 1100 integrated with a conventional network router, based, for example, on the IP network layer. Several link layers 1105 form the different link layer interfaces of the conventional network router. Above the link layer is a packet classifier 1110 and several routing engines. The packet classifier 1110 makes decisions on how to process a packet by looking at the packet header. The routing engines above the link layer include an MPLS routing engine 1115, an IP routing engine 1120, and a semantic packet routing engine 1125. The advantages of this design come from the tight integration of the routing apparatus with the semantic filtering apparatus. In the overlay network design, typically a semantic packet must pass through such a conventional router to reach the semantic router, and then pass through the router a second time as it exits the semantic router. Further, this traffic is limited by the bandwidth of the network link between the conventional router and the semantic router. Typically, conventional routers can transfer packets internally at much higher speeds than can be achieved over external media (such as optic fibers or copper cables). Co-locating the semantic router with the conventional router can thereby increase the throughput of the system. A disadvantage of this design is that the processing power of the conventional router must be shared between the semantic routing and the other processing requirements of the conventional network. The optimal embodiment in a particular network environment will depend on the balance between bandwidth and processing capabilities of the individual elements that comprise the network.

Applications of the System

Generic Operation

Figure 20:
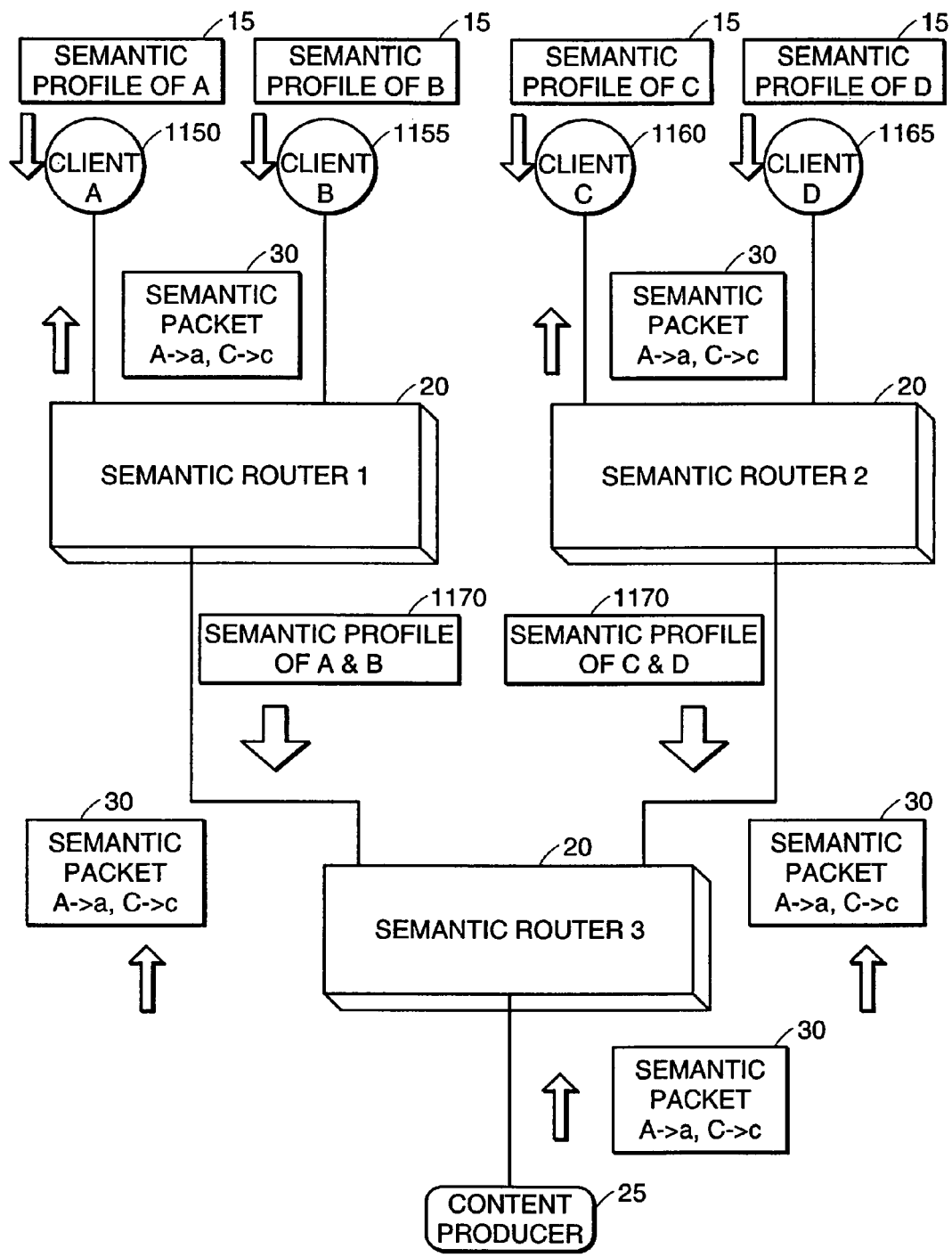
FIG. 20 illustrates a simplified system of the present invention.

FIG. 20 illustrates an exemplary embodiment of the present invention. In this example there are four different content consumers namely: client A 1150, client B 1155, client C 1160, and client D 1165. Each of these consumers prepares a semantic profile 15 and the peer clients format them and send them to the semantic routers 20 to which they are connected. The semantic profiles 15 are aggregated 1170 at semantic router-1 20 and semantic router-2 20. This aggregation operation contributes to the scalability of the present invention. Because of aggregation, the profile is smaller and occupies less memory space in the semantic routers 20 and thus reduces the amount of data (or state) associated with each port of the semantic routers 20. Also when a profile associated with a content consumer changes, the nearest semantic router 20 is notified about the change. Alternatively, this change propagates to all the semantic routers 20 in the semantic network. If the semantic profiles 15 are not aggregated then each content consumer semantic profile 15 is propagated to all the semantic routers individually. In the case of aggregation and when there is a high degree of overlap between the all the semantic profiles of the content consumers connected to a particular router, it is highly likely that a change in an individual profile already falls within the scope of the aggregated profile. The probability of falling within an existing aggregation increases along the path from the content consumer back towards the content producer. A change to a profile need only be propagated if it is not already part of the aggregated profile. Typically, because of aggregation, the aggregated semantic profiles 15 encompass the changed semantic profiles 15 very easily. This usually can happen very near to the edge of the semantic network. The aggregation of semantic profiles also provides content consumers (e.g., clients A-D) with a certain degree of anonymity. Once the semantic profiles 15 are aggregated, semantic routers closer to the content producer cannot distinguish which content consumer injected which element of the aggregated profile. Semantic router-3 20 further aggregates the profiles. On the other hand, when a content producer 25 produces the content which is of interest to peer clients client A 1150 and client C 1160, the semantic router-3 20 compares the semantic packet 30 against the semantic profiles 15 sent by semantic router-1 20 and semantic router-2 20. Since the profiles from these routers contain the embedded profiles of peer client A 1150 and client C 1160, the comparison matches and the semantic packet 30 is sent towards both semantic router-1 20 and semantic router-2 20. The operations of both semantic router-1 20 and semantic router-2 20 are also the same. Semantic router-1 20 and semantic router-2 20 compare the individual semantic profiles 15 of peer clients (client A, B, C, D). According to this example, there is a match between the semantic profile of peer client A 1150 with the semantic packet 30 from the content producer and as a result the semantic packet 30 is sent towards client A 1150. However, the packet 30 is not sent towards peer client B 1155 because its semantic profile does not match the semantic packet 30. A similar operation occurs at semantic router-2 20 with respect to client C 1160 and client D 1165.

Person-to-Person eCommerce

An application of the present invention as explained above is a Person-to-Person e-commerce application. Suppose in the above example client A is interested in buying a book on some particular topic. The book is available at a local store in a nearby area. Client A does not have knowledge about such local availability. In the currently-available service model, client A may execute a search for the book on the world wide web using several popular search engines and upon finding the book may buy it from an online store that will deliver the book after 3-4 days. In the present invention, if the local store, as content producer, publishes the information about the availability of the book with appropriate semantic descriptors, and client A has expressed an interest in the book with an appropriate semantic profile, then the information about the availability of the book at the local store can be delivered to client A thereby allowing client A to buy the book locally that same day.

Corporate Intranet

An instance of the present invention can be run in a corporate intranet environment, where the company locations are distributed geographically. Presently, companies typically have central databases where employees can look for content interesting to them. Typically such content may comprise information that is the property of the company and information gathered from outside sources. In such a setting, an application, built on top of semantic network confined to an intranet but capable of talking to other semantic networks, can be created. This application uses an exemplary field of the semantic profile to determine the order in which information is sought or delivered. The employees may have semantic profiles with this field set to "internal only" or "external after internal" mode of profile propagation. Thus, the semantic routing can be confined within the company, or the company information can be consulted first. The semantic network may further operate as a corporate firewall by instructing the semantic routers in the network not to propagate semantic packets to content consumers outside the company.

Crawlerless Search Engine

Figure 21:
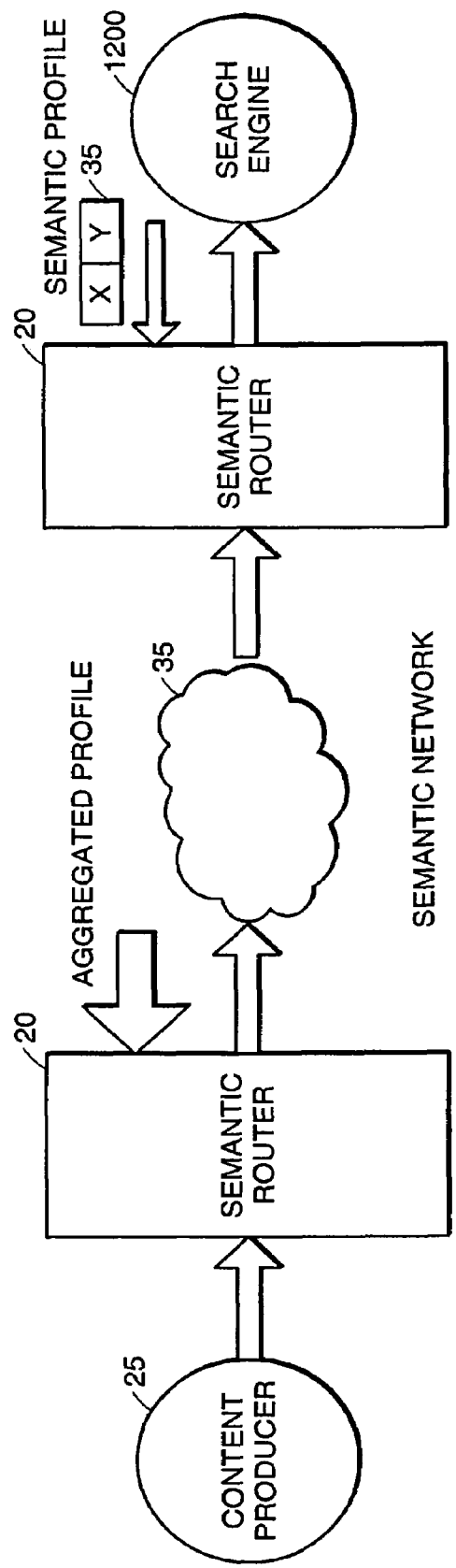
FIG. 21 illustrates an implementation of the present invention as a Crawler-less Real-time Search Engine.

FIG. 21 illustrates an exemplary embodiment of the present invention as a Crawler-less Real-time Search Engine. In this embodiment, the search engine 1200 is a content consumer. The search engine is interested in receiving information about X, but only if it has been changed by the content provider since time Y. To receive the desired content, the content consumer creates a semantic profile 15 with the appropriate information and sends it to the nearest semantic router 20. The semantic routers 20 in the semantic network aggregate 35 the semantic profile 15 of the search engine with other such profiles. A semantic router 20 near a content producer 25 receives the aggregated profile. The semantic packet produced by the content producer 25 is then given to the nearest semantic router 20. If the criteria specified by the aggregated profile are satisfied then the packet is sent towards the search engine 1200. All the semantic routers 20 in the semantic network 35 perform the same operation. The only difference is that the content that matches the semantic profile of search engine 1200 is routed towards toward the content consumer.

In this embodiment of the present invention, the semantic profile 15—the search engine—does not need to do the conventional crawling that search engines presently perform. This allows content consumers to always receive fresh content based on the criteria specified in the semantic profile.

Location Aware Application

Figure 22:
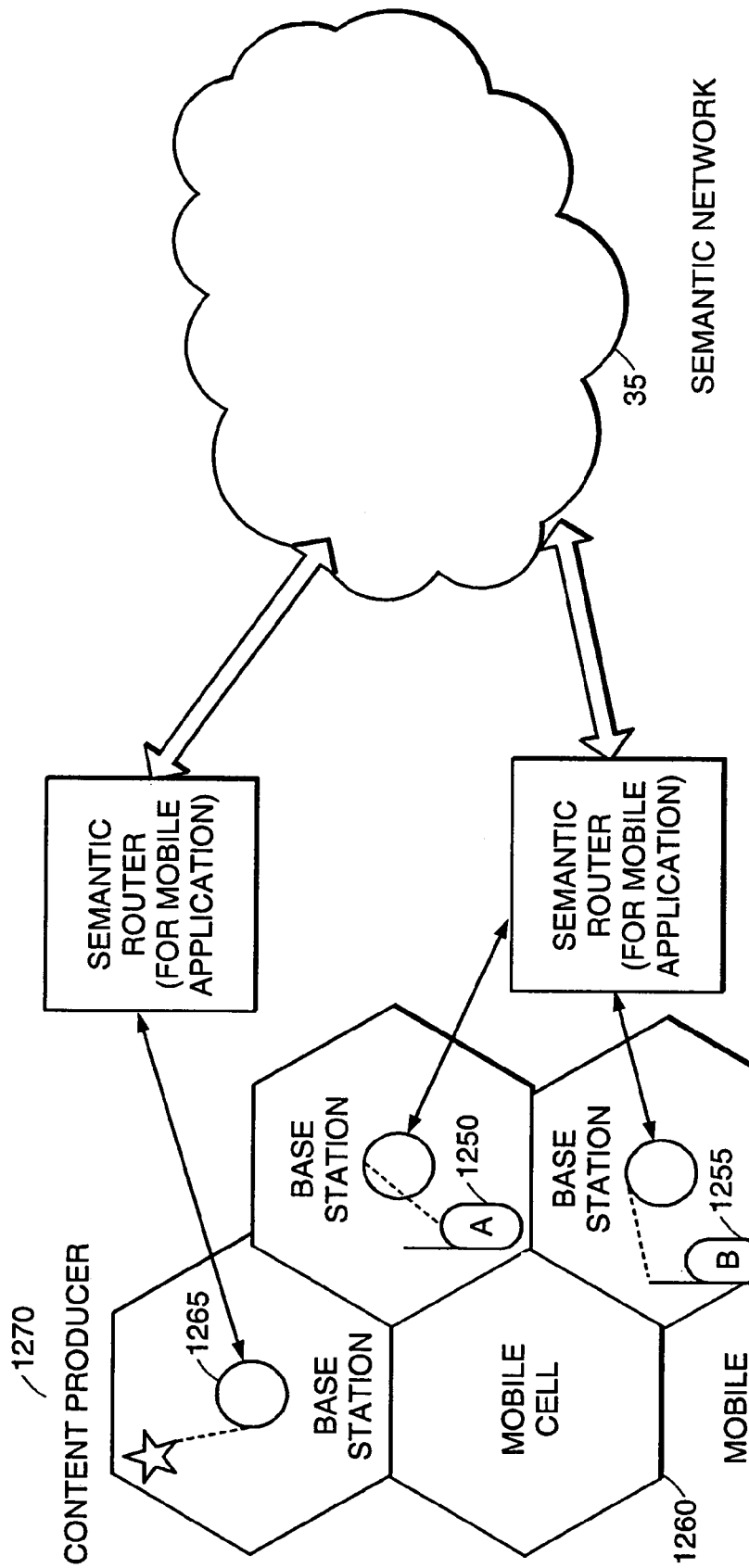
FIG. 22 illustrates an implementation of the present invention as a location-aware information distribution system.

FIG. 22 depicts a location-aware implementation of the present invention in mobile networks with a semantic network overlay. Mobile phone user A 1250 and mobile phone user B 1255 are in two different mobile cells. Each mobile cell 1260 contains at least one base station 1265 with which mobile users interact with when the mobile phone users are within that particular mobile cell 1260. As a result of being in the neighborhood of a given base station, the cellular telephony system is aware of the general location of each subscriber. This information may be used in the following exemplary manner. Suppose that both the mobile phone users are fans of rock music. Further, suppose there is an entertainment concert scheduled to happen in their vicinity but in another mobile cell 1260. Mobile phone user A 1250 has a ticket to the concert, but can no longer attend. Mobile phone user B 1255 finds out about the concert by injecting a semantic profile that matches the content produced by the content producer 1270, i.e., the promoter of the concert. User A produces semantic packets containing the desire to sell the concert tickets. User B 1255 further sends a semantic profile with the desire to buy the concert tickets if anyone is ready to sell. The semantic packet of user A is then routed towards user B because of semantic affinity. This way user B 1255 learns of the availability of the tickets and the users are able to meet because they are not very far from each other. So this way both user A and B are able to take advantage of the location-aware semantic application written on top of semantic overlay network. As will be clear to those practiced in the art, other forms of location-aware services, for example using Global-Position-Sensing equipment, may be used in a similar fashion.

Although the invention has been described and illustrated in the foregoing exemplary embodiments, it is understood that the present disclosure has been made only by way of example, and that numerous changes in the details of construction and combination and arrangement of processes and equipment may be made without departing from the spirit and scope of the invention as claimed below.

What is claimed:

1. A method for routing data through a network based on semantics of content of the data being routed wherein the network comprises a plurality of routers, comprising:
   configuring the plurality of routers to route data packets through the network based on the semantics of the content of the data packets by
      receiving a plurality of semantic profiles at one or more of the routers, the semantic profiles including information that identifies consumers' interests in receiving content of a given description,
      operating on the semantic profiles received at one of a plurality of routers to identify areas of overlapping interests of consumers,
      aggregating the semantic profiles using the identified areas of overlapping interests, and
      propagating the aggregated semantic profiles to other ones of the plurality of routers;
   routing a data packet through the network by making comparisons between at least the semantic content included in the data packet and the semantic content of the aggregated semantic profiles received from other routers; and
   forwarding the data packet to at least one of the plurality of routers or to the content consumer when there is a match of the semantic content.

2. The method of claim 1 wherein the network comprises content producers, content consumers and semantic routers.

3. The method of claim 2 wherein the content consumers, content producers, and semantic routers communicate through links, wherein each link comprises two ports and wherein each port is associated with a semantic profile which is used to determine if a data packet will be forwarded across the link.

4. The method of claim 3 wherein the semantic profile associated with one port is sent by an entity connected to the other port of the same link.

5. The method of claim 3 wherein the semantic profile associated with one port is determined by an entity connected to the other port of the same link.

6. The method of claim 3 wherein the semantic profile for at least one port is determined by aggregating the profiles associated with all the ports on the entity connected through the port's link, excluding the port on the other side of the link.

7. The method of claim 1 further comprising classifying the content before creating the data packet.

8. The method of claim 1 further comprising filtering the routed data packet before reaching a content consumer.

9. The method of claim 1 further comprising distributing the aggregated semantic profiles into a semantic network.

10. The method of claim 1 wherein the data packet comprises a header and content.

11. The method of claim 10 wherein the header comprises at least one semantic descriptor and zero or more semantic signatures, further comprising providing a forwarding agent to route the data packet through the network using the at least one semantic descriptor, or if available, the zero or more semantic signatures.

12. The method of claim 1 wherein the plurality of semantic profiles express a plurality of content consumers' interests in receiving content.

13. The method of claim 1, further comprising sending data packets through the routers by tunnelling.

14. The method of claim 1 wherein said method is deployed as an overlay network on top of conventional network routers.

15. The method of claim 1 wherein the semantic profiles contain content consumers' current locations allowing delivery of location-specific content.

16. The method of claim 3 wherein content is only forwarded along a link if the content matches a content consumer's interest as specified in the semantic profile of the content consumer.

17. The method of claim 1 wherein the matching of content to a semantic profile is done by comparing structured XML packet headers and content routing trees.

18. The method of claim 1 wherein the semantic profiles include a policy profile that allows the network to filter content received by a content consumer.

19. The method of claim 1 wherein the semantic profiles include a policy profile that allows the network to filter content received by part of the network.

20. The method of claim 10 wherein the header of the semantic profiles include one or more semantic signatures, wherein mappings between at least one semantic signature of previously processed packets are maintained and routing decisions are enhanced for packets with identical semantic signatures.

21. The method of claim 1 wherein the plurality of routers comprise semantic routers and the network comprises a semantic log keeper which is aware of at least one of the semantic routers.

22. The method of claim 21 further comprising:
contacting a semantic log keeper;
using routing data obtained from the semantic log keeper to query different semantic routers; and
selecting suitable semantic routers based on responses to queries.

23. The method of claim 21 wherein the semantic log keeper functionality is implemented in a management and operation station with the network on which the semantic network is running.

24. A semantic router for routing data through a network based on semantics of content of the data received comprising:
means for receiving a plurality of semantic profiles wherein the semantic profiles include information that identifies consumers' interests in receiving content of a given description;
means for operating on the received semantic profiles to identify areas of overlapping interests of consumers;
a profile manager that aggregates the semantic profiles using the identified areas of overlapping interests;
a first forwarding agent propagating the aggregated semantic profiles to neighboring semantic routers in the network;
a routing engine that routes a data packet through the network by making comparisons at least between the semantic content included in the data packet and the semantic content of aggregated semantic profiles received from the neighboring routers in the network; and
a second forwarding agent that forwards the data packet to at least one of the neighboring semantic routers or to the content consumer when there is a match of the semantic content.

25. The semantic router of claim 24 further comprising a load manager which maintains a balance between processing and throughput of the semantic router.

26. The semantic router of claim 24, wherein the semantic router communicates with other semantic routers through links, wherein each link comprises two ports and wherein each port is associated with a semantic profile which is used to determine if a data packet will be forwarded across the link and wherein the load manager may simplify the semantic profile of one or more ports to reduce the router's processing load.

27. The semantic router of claim 24 wherein the routing engine includes a routing cache holding mappings between at least one semantic signature of previously processed packets and the routing engine's routing decisions to speed up the routing decision for packets with identical semantic signature.

28. The semantic router of claim 24 wherein the semantic profiles are aggregated into ontological trees that are used to form routing tables.

29. The semantic router of claim 28 wherein the load manager manages the processing load of the routing apparatus by reducing precision in the aggregated semantic profiles.

30. The semantic router of claim 29 wherein the first forwarding agent comprises a signaling agent that sends the aggregated semantic profiles to the other routing apparatus to update routing data of the other routing apparatus.

31. The semantic router of claim 30 wherein the profile manager, the load manager and the signaling agent interact to balance processing load of the routing apparatus.

32. The semantic router of claim 25 wherein the load manager manages processing load partly by delegating the processing load of the routing apparatus to neighboring routing apparatus.

33. The semantic router of claim 25 wherein the load manager interacts with other routing apparatus and a semantic log keeper to become aware of current topology of the network.

34. The semantic router of claim 24 wherein the semantic router can be deployed in a non-overlay network which comprises:
a plurality of link layers forming the different link layer interfaces;
a packet classifier;
a semantic routing engine; and
multiple additional routing engines, such as an IP, or MPLS routing engines.

35. The semantic router of claim 24 wherein the first forwarding agent distributes the aggregated semantic profiles into a semantic network.

36. A method for routing data through a network based on semantics of content of the data being routed comprising:
receiving an interest in specified content from a content consumer;
creating a semantic profile comprising said interest in specified content;
propagating the semantic profile to a semantic router;
operating on the semantic profile received at least one semantic router to identify areas of overlapping interests of consumers;
aggregating the semantic profile with other semantic profiles on at least one semantic router;
propagating the aggregated semantic profiles through a network wherein the network comprises a plurality of semantic routers;
receiving a data packet including semantic content; and
propagating the data packet through the network towards the content consumer based at least on a comparison between the semantic content included in the semantic packet and the content consumer's semantic profile.

37. The method of claim 36 wherein the content consumer is a search engine.

38. The method of claim 36 further comprising distributing the aggregated semantic profiles into a semantic network.

39. The method of claim 36 wherein the semantic profile contains the consumer's current location which allows delivery of location-specific content.

40. A method for routing data through a network based on semantics of content of the data being routed wherein the network comprises a plurality of semantic routers, the method comprising:
configuring the semantic routers by:
receiving a plurality of content profiles at one or more of the semantic routers, the content profiles including information that identifies content producers' available data of a specified content, operating on the content profiles received at a semantic router to identify areas of overlapping content available from content producers, aggregating the content profiles using the identified areas of overlapping content, and propagating the aggregated content profiles to neighboring semantic routers in the network;

receiving a request for data of a specified content at one of a plurality of routers in a network wherein the request for data comprises a semantic descriptor of the specified content; and routing the request for data through the network by making comparisons between at least the semantic content included in the request and the semantic content of the aggregated content profiles received from the neighboring semantic routers and forwarding the request to at least the content producer or at least one of the neighboring routers when there is a match of the semantic content.

41. The method of claim 40 further comprising distributing the aggregated content profiles into a semantic network.

42. The method of claim 40 further comprising receiving a data packet including the specified content and a return address of the requestor and routing a new data packet containing the requested data directly to the requestor.

43. The method of claim 40 further comprising in response to receipt of a request for data, creating one or more data packets which include specified content and transmitting these to one or more routers in the network for general availability to any interested consumers.

44. The method of claim 40 wherein the content profiles contain content producers' current locations which allows searching for location-specific content.

45. A method for configuring a network for routing data based on content or semantics of the data wherein the network comprises a plurality of semantic routers comprising:

receiving a plurality of content profiles at least one of the plurality of semantic routers, the content profiles including information that identifies content producers' available data of a specified content;

operating on the content profiles received at the at least one of the plurality of semantic routers to identify areas of overlapping content available from content producers;

aggregating the content profiles using the identified areas of overlapping content;

propagating the aggregated content profiles to neighboring ones of the plurality of semantic routers in the network;

receiving a plurality of semantic profiles at the least one of the plurality of semantic routers, the semantic profiles including information that identifies consumers' interests in receiving content of a given description;

operating on the semantic profiles received at the least one of the plurality of semantic routers to identify areas of overlapping interests of consumers;

aggregating the semantic profiles using the identified areas of overlapping interests; and propagating the aggregated semantic profiles to neighboring ones of the plurality of semantic routers in the network.

46. The method of claim 45 further comprising distributing the aggregated semantic profiles into a semantic network.

\* \* \* \* \*

UNITED STATES PATENT AND TRADEMARK OFFICE
CERTIFICATE OF CORRECTION

| | | |
|---|---|---|
| PATENT NO. | : 7,555,563 B2 | Page 1 of 1 |
| APPLICATION NO. | : 11/710870 | |
| DATED | : June 30, 2009 | |
| INVENTOR(S) | : Maximilian A. Ott et al. | |

It is certified that error appears in the above-identified patent and that said Letters Patent is hereby corrected as shown below:

On the Title Page of the Letters Patent:

In Column 1, Item (73), the Assignee name should read as follows:

[Semandek] Semandex Networks Inc.

In Column 2, Item (57), the Abstract should read as follows:

A method, system and apparatus for routing data through a network based on the content or semantics of the data. Semantic routing engines route the data through the network based upon information maintained in routing tables. The routing tables used to route the content through the network are derived by aggregating information about either content consumers or content producers into ontological[[.]] trees.

Signed and Sealed this

Twenty-fifth Day of August, 2009

David J. Kappos
*Director of the United States Patent and Trademark Office*